US00RE36214E

United States Patent [19]

Podd, Sr. et al.

[11] E Patent Number: Re. 36,214

[45] Reissued Date of Patent: Jun. 1, 1999

[54] BRACING SYSTEM FOR A LINER FOR A CARGO CONTAINER

[76] Inventors: Victor T. Podd, Sr., 255 Beverly Avenue, Montreal (Quebec), Canada, H3P 1K8; Victor I. Podd, Jr., 2582 NW. 59th St., Boca Raton, Fla. 33496; Stephen D. Podd, 1321 Sherbrooke Street West, Apt. E-1, Montreal (Quebec), Canada, H3G 1J4

[21] Appl. No.: 08/659,415

[22] Filed: Jun. 6, 1996

Related U.S. Patent Documents

Reissue of:

[64] Patent No.: 5,318,193
Issued: Jun. 7, 1994
Appl. No.: 07/869,246
Filed: Apr. 15, 1992

[60] Division of application No. 07/627,695, Dec. 14, 1990, Pat. No. 5,152,735, which is a continuation-in-part of application No. 07/482,030, Feb. 15, 1990, Pat. No. 5,181,625.

[51] Int. Cl.[6] ..... B65D 25/16

[52] U.S. Cl. ..... 220/1.5; 410/140

[58] Field of Search ..... 220/1.5; 383/33, 383/34, 34.1, 121.1; 55/367, 369, 378; 410/140

[56] References Cited

U.S. PATENT DOCUMENTS

| | | | |
|---|---|---|---|
| 2,063,434 | 12/1936 | Hersey et al. . | |
| 2,546,929 | 3/1951 | Nampa . | |
| 2,565,997 | 8/1951 | Stone . | |
| 2,766,704 | 10/1956 | McMahon . | |
| 3,427,997 | 2/1969 | Brown, Jr. et al. . | |
| 3,477,209 | 11/1969 | Fesco | 55/367 |
| 3,696,952 | 10/1972 | Bodenheimer . | |
| 3,712,663 | 1/1973 | Laven . | |
| 3,751,881 | 8/1973 | Hughes | 55/367 |
| 3,868,042 | 2/1975 | Bodenheimer . | |
| 3,980,196 | 9/1976 | Paulyson et al. . | |
| 4,124,136 | 11/1978 | Bjelland et al. . | |
| 4,436,466 | 3/1984 | Marino . | |
| 4,498,824 | 2/1985 | Kinkle . | |
| 4,556,349 | 12/1985 | Koudstaal . | |
| 4,784,287 | 11/1988 | Yamada et al. . | |
| 4,799,607 | 1/1989 | Podd . | |

(List continued on next page.)

FOREIGN PATENT DOCUMENTS

| | | |
|---|---|---|
| 2226300 | 6/1990 | United Kingdom . |
| 2228468 | 9/1990 | United Kingdom . |

OTHER PUBLICATIONS

Marino Technologies, Inc., Opa-Locka , FL, Marino Contents 2-sided brochure, 1 page, 1989.

ConTents-Installation Instructions, 6 pages, 1989.

Fell-Fab Brochure, Fell-Fab Products Packaging Division, Ontario, Canada, 1980, 12 pages.

Sea Bulk Powerliiner, Powertex, Inc., Container Management, Oct. 1989, pp. 3-7.

*Primary Examiner*—Steven M. Pollard
*Attorney, Agent, or Firm*—Dority & Manning, P.A.

[57] ABSTRACT

A cargo container comprising a container body defining an interior cargo space, a flexible and expandable liner secured inside the container body, a bulkhead positioned in the container body and held against the liner, and bracing apparatus to brace the bulkhead in the cargo container. A first embodiment of the bracing apparatus includes a plurality of vertical beams connected to a floor of the container body, horizontally spaced apart and vertically extending upward against the bulkhead; and a multitude of cross beams connected to the vertical beam to held hold those beams upright. A second embodiment of the bracing apparatus includes a plurality of upwardly extending straps and a plurality of laterally extending straps. These upwardly extending straps are connected to and extend between a floor and a ceiling of the container body, and are positioned against the bulkhead; and the laterally extending straps of this bracing apparatus are connected to and extend between left and right sidewalls of the container body, and are also positioned against the bulkhead.

6 Claims, 20 Drawing Sheets

U.S. PATENT DOCUMENTS 4,842,459 6/1989 Jensen et al. .
4,861,357 8/1989 Gavin et al. ..... 55/367
4,880,342 11/1989 Pradovic .
4,884,722 12/1989 Podd .
4,948,266 8/1990 Bencic ..... 383/34
5,040,693 8/1991 Podd, Sr. et al. .
5,152,735 10/1992 Podd, Jr. et al. .
5,193,710 3/1993 Podd, Sr. et al. .
5,244,332 9/1993 Krein et al. .

BRACING SYSTEM FOR A LINER FOR A CARGO CONTAINER

Matter enclosed in heavy brackets [ ] appears in the original patent but forms no part of this reissue specification; matter printed in italics indicates the additions made by reissue.

This application is a divisional of copending application Ser. No. 627,695, filed on Dec. 14, 1990, now U.S. Pat. No. 5,152,735, which is a continuation-in-part of application Ser. No. 482,030, filed on Feb. 15, 1990, now U. S. Pat. No. 5,181,625.

BACKGROUND OF THE INVENTION

The present invention generally relates to liners for cargo containers, and more specifically, to liners for containers used to carry bulk cargos.

Standardized containers or boxes have come into very extensive use for the shipment of freight by land and sea, and the many advantages of such containers have made it extremely desirable to adapt them for use with as many types of cargo as possible. Accordingly, there have been attempts, with varying degrees of success, to use conventional containers to carry bulk cargo such as dry bulk chemicals, powdered and pelletized resins, flour, coffee and grains.

When cargo containers are used to carry such bulk cargo, it is important that the container itself either be kept clean or be cleaned after each load of cargo is emptied from the container, so that the container can be subsequently used with another load of cargo. Moreover, it is important to protect the bulk cargo from contamination and from undesirable exposure to the natural elements.

For these reasons, large plastic removable liners are often used to line the interior walls or surfaces of the cargo containers that are used to carry bulk cargo. The liner protects the cargo during shipment, for example, from rain and debris; and after the cargo is delivered, the liner can be removed so that the container is again usable, without significant cleaning, to carry other cargo.

Various difficulties have been encountered, however, in using plastic liners i the above-described manner; and in particular, it has been found that the liners often tear or rupture under certain conditions. For example, a cargo container carrying bulk cargo is often emptied by opening the rear doors of the container, and raising the front end of the container to tilt the container so that the cargo slides out the back of the container. Prior art container liners often tear or rupture as the cargo slides rearward through the container and over the liner. Various attempts have been made to solve this problem by using braced cardboard or wood bulkheads to help support the liner inside the container, or by hanging the liner from the container roof or walls by means of a multitude of hooks connected to the top perimeter of the liner. These prior art attempts have not been completely successful, however.

It is believed that at least many tears that develop in a liner for a cargo container are caused by wrinkles in the bottom of the liner. Such wrinkles create pockets that trap product inside the liner; and when the container is tilted to empty the product, the weight of the trapped product creates stresses on the bottom of the liner, which may cause the liner to tear. Although numerous container liners have been in use for many years, very little attention has been paid to fastening the liners in a cargo container and in particular, in the floor area thereof. On existing liners, the industry in general normally suspends the liner from the ceiling area of the container.

The number of wrinkles in the bottom of a liner can be substantially reduced or completely eliminated by holding the liner tightly stretched across the interior of the cargo container. If this is done, however, tears or rips may develop in the areas of the liner that are used to secure the liner in place inside the container.

Another difficulty encountered when using plastic liners in the manner described above, is to hold the liner in place when the cargo container is tilted to empty the container of its contents. One way to address this difficulty is to locate a bulkhead against the back end of the liner and to brace that bulkhead against rearward movement so that the bulkhead holds the liner in place when the container is tilted. Various very effective systems are known for bracing bulkheads in cargo containers; however, it is believed that these prior art systems can be improved. In particular, these prior art bulkhead bracing systems are relatively expensive and require a considerable amount of time to install properly, and it is believed that these systems can be improved by making them less expensive and easier to install.

SUMMARY OF THE INVENTION

An object of the present invention is to improve the resistance of cargo container liners to tears and ruptures caused by bulk cargo inside the containers.

Another object of this invention is to improve systems to brace liners inside large cargo containers.

A further object of the present invention is to provide a simple and inexpensive, yet very effective, system to brace a bulkhead that is used to hold a liner inside a cargo container.

An object of this invention is to provide a collapsible bulkhead that is strong enough to support a fully loaded liner in a cargo container.

A further object of the present invention is to form a liner for an intermodal cargo container, from a tubular shaped material, and to fold that tubular material in such a way so as to also form therefrom various items for the liner that conventionally are made from separate pieces of material.

Still another object of this invention is to provide a liner for an intermodal cargo container and that is especially well-suited for carrying garbage or other waste material.

A first aspect of this invention is a cargo container comprising a container body defining an interior cargo space, a flexible and expandable liner secured inside the container body, a bulkhead positioned in the container body and held against the liner, and bracing apparatus to brace the bulkhead in the cargo container. A first embodiment of the bracing apparatus includes a plurality of vertical beams connected to a floor of the container body, horizontally spaced apart and vertically extending upward against the bulkhead; and a multitude of cross beams connected to the vertical beam to held hold those beams upright.

A second embodiment of the bracing apparatus includes a plurality of upwardly extending straps and a plurality of laterally extending straps. These upwardly extending straps are connected to and extend between a floor and a ceiling of the container body, and are positioned against the bulkhead; and the laterally extending straps of this bracing apparatus are connected to and extend between left and right sidewalls of the container body, and are also positioned against the bulkhead.

In a third embodiment, the bracing apparatus includes first and second straps connected to the container body and extending downward, forward of the bulkhead. Each of these straps includes at least one respective loop; and the bracing apparatus further includes at least a first beam member laterally extending rearward of and against the bulkhead, and extending through and supported by the loops of the straps. Left and right ends of the beam member are braced by the container body against rearward movement; and the beam member, in turn, braces the bulkhead against rearward movement.

A fourth embodiment of the bracing apparatus includes a plurality of upwardly extending beams and a plurality of cross beams. These upwardly extending beams are connected to the floor of the container body, are horizontally spaced apart and extend upward along the bulkhead, and the cross beams of this bracing apparatus are connected to the upwardly extending beams, and laterally extend rearward of and against the bulkhead. Each of these cross beams has left and right ends that are braced by the container body against rearward movement, and these cross beams brace the bulkhead against rearward movement.

In both the third and fourth embodiments of the bracing apparatus, the cross beams are preferably braced against rearward movement by being located immediately forward of and abutting against left and right back corner posts of the container body.

A second aspect of this invention comprises a method of forming a liner from a flexible, tubular member having front and back ends, comprising folding together first and second sections of the tubular member, each of said sections extending rearward from the front end of the tubular member, to form a front panel for the liner and a bottom flap extending from the front panel. The method further comprises connecting a lower edge of the front panel to an adjacent portion of the tubular member to form a bottom, front edge of the liner, with the bottom flap extending outward from the bottom, front edge; and forming from the bottom flap a transverse sleeve extending along the bottom., front edge of the liner. With alternate embodiments of this method, inlet and outlet chutes may be formed for the liner from back top and back bottom flaps of the liner.

A further aspect of the present invention is a collapsible bulkhead for supporting a liner inside a cargo container. The bulkhead includes a central wall member adapted to rest on the floor of the cargo container in a close fit with the sidewalls thereof, and defining a discharge outlet to discharge cargo from the container. The central wall member of the bulkhead includes a first section and a second section foldably connected to the first section for folding movement between open and folded positions. In the open position, the second section extends outward from the first section, generally coplanar therewith; and in the folded position, the second section extends over the first section thereof, generally parallel thereto.

Preferably, the bulkhead further includes left and right panels that are connected to and extend outward from left and right side edges of the central wall member, and these panels are adapted to fit against left and right side walls of a cargo container to help hold the bulkhead securely therein. To facilitate the above-described folding movement of the central wall member, the left and right panels of the bulkhead are each comprised of two, spaced apart section.

Further benefits and advantages of the invention will become apparent from a consideration of the following detailed description given with reference to the accompanying drawings, which specify and show preferred embodiments of the invention.

A BRIEF DESCRIPTION OF THE DRAWINGS

Figure 12:
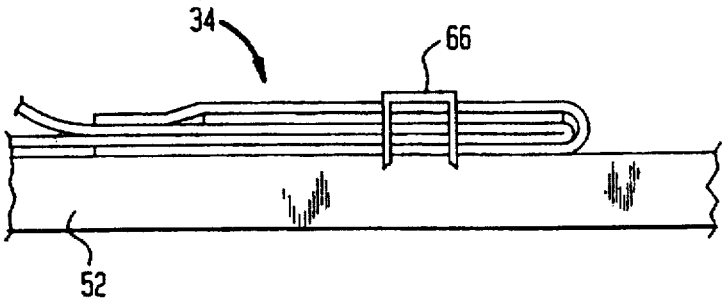

FIG. 12 generally illustrates how a lower connecting segment of the liner may be connected to a floor of the cargo container.

Figure 13:
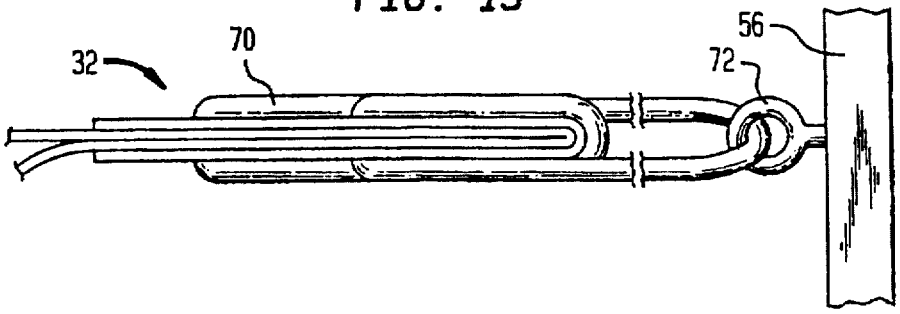

FIG. 13 generally illustrates how an upper connecting segment of the liner may be connected to a wall of the cargo container.

Figure 14:
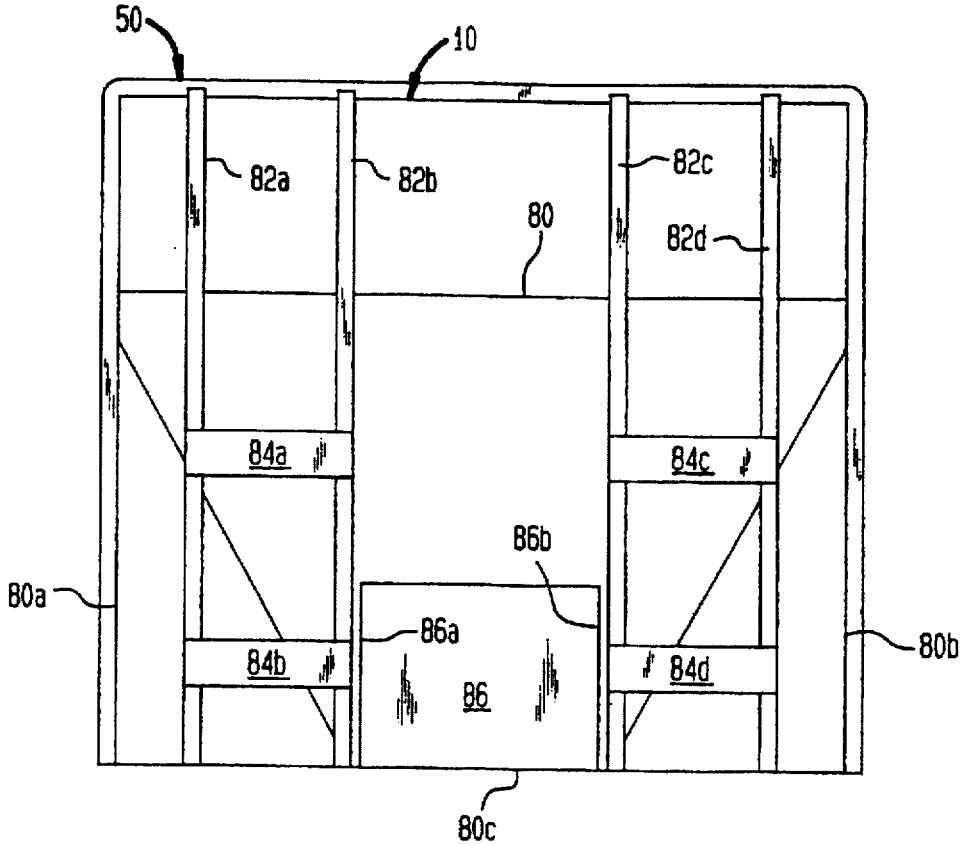

FIG. 14 shows a bulkhead, and a bracing system for the bulkhead, to support the liner in a cargo container.

Figure 15:
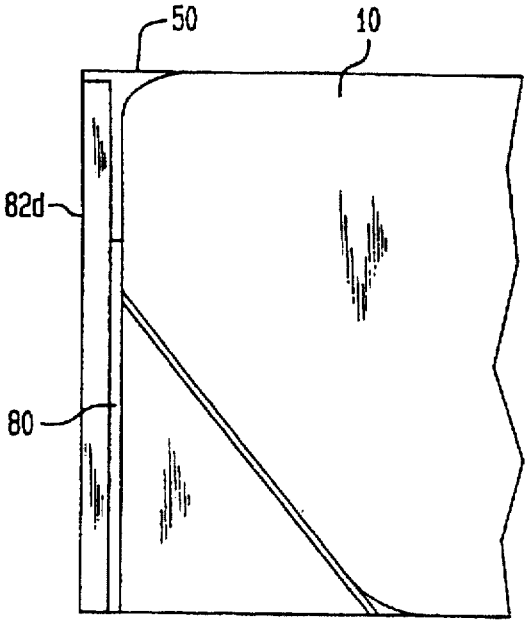

FIG. 15 is a side view of the bulkhead and bracing system of FIG. 14.

Figure 16:
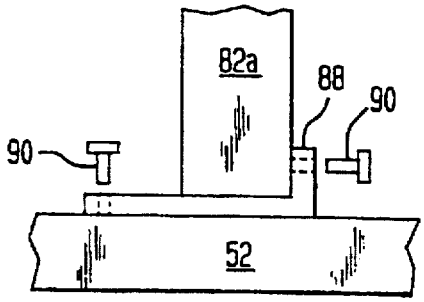

FIG. 16 illustrates how one of the beams of the bracing system of FIGS. 14 and 15 may be connected to the floor of a cargo container.

Figure 17:
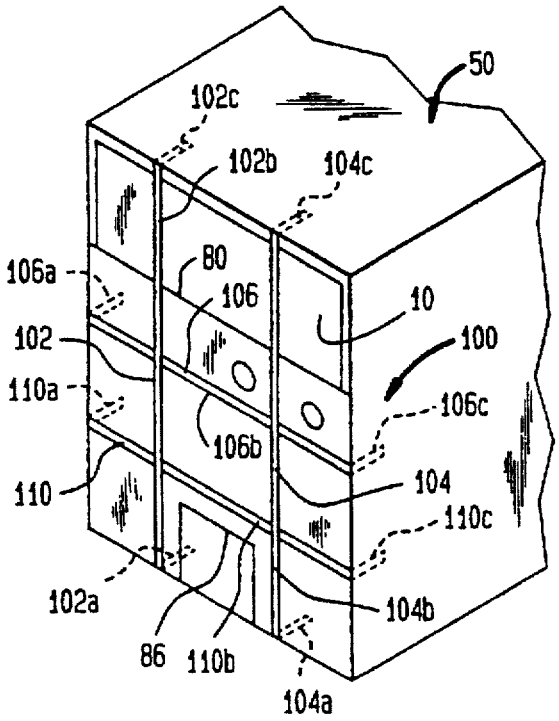

FIG. 17 shows an alternate system for bracing a bulkhead in a cargo container.

Figure 18:
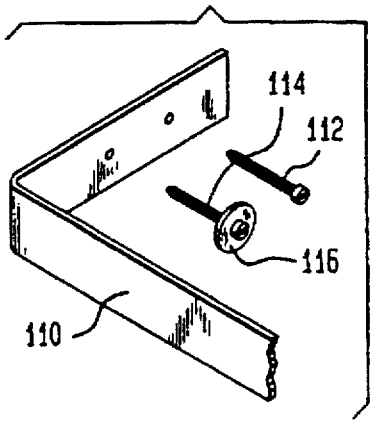
Figure 19:
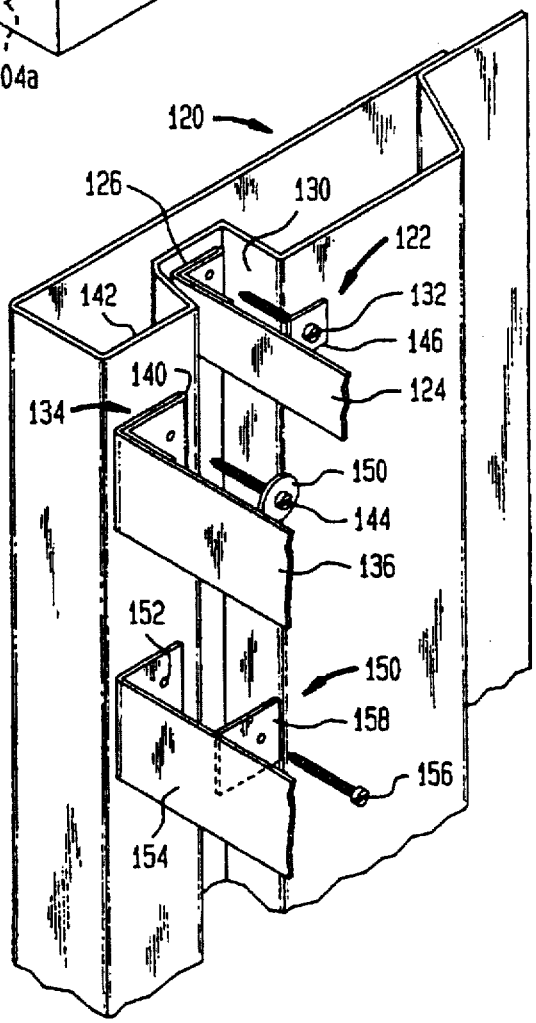

FIGS. 18 and 19 illustrate various arrangements for connected strips of the bracing system of FIG. 17, to a sidewall of the cargo container.

Figure 20:
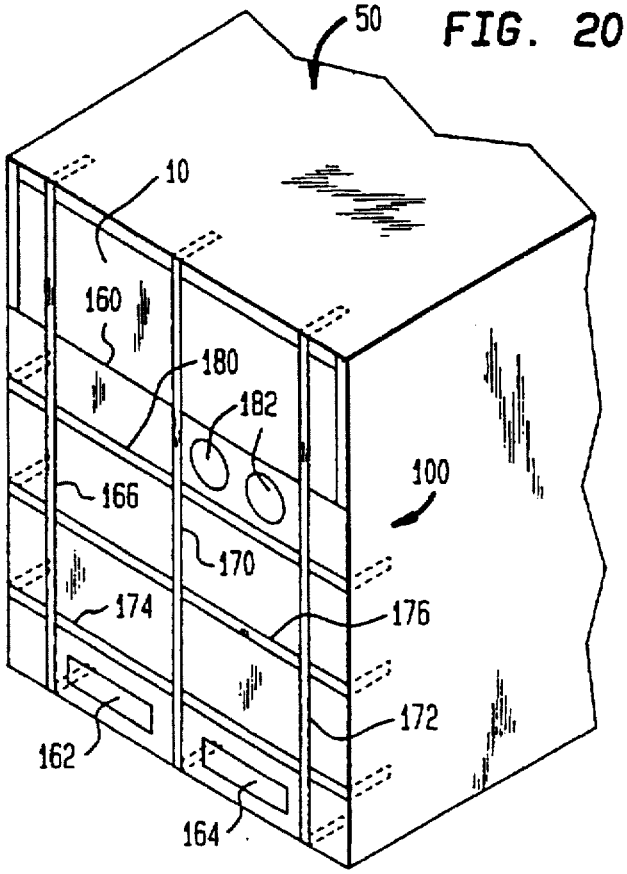
Figure 21:
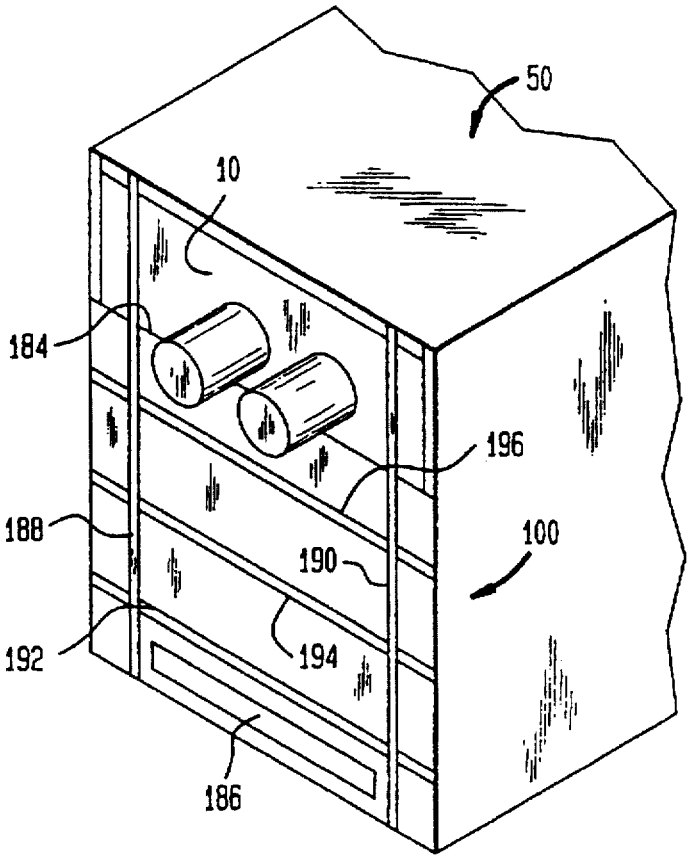

FIGS. 20 and 21 show additional systems for bracing a bulkhead in a cargo container.

FIGS. 22 to 25 show bracing systems that may be used with or without bulkheads, to brace one or more flexible liners in a cargo container.

Figure 26:
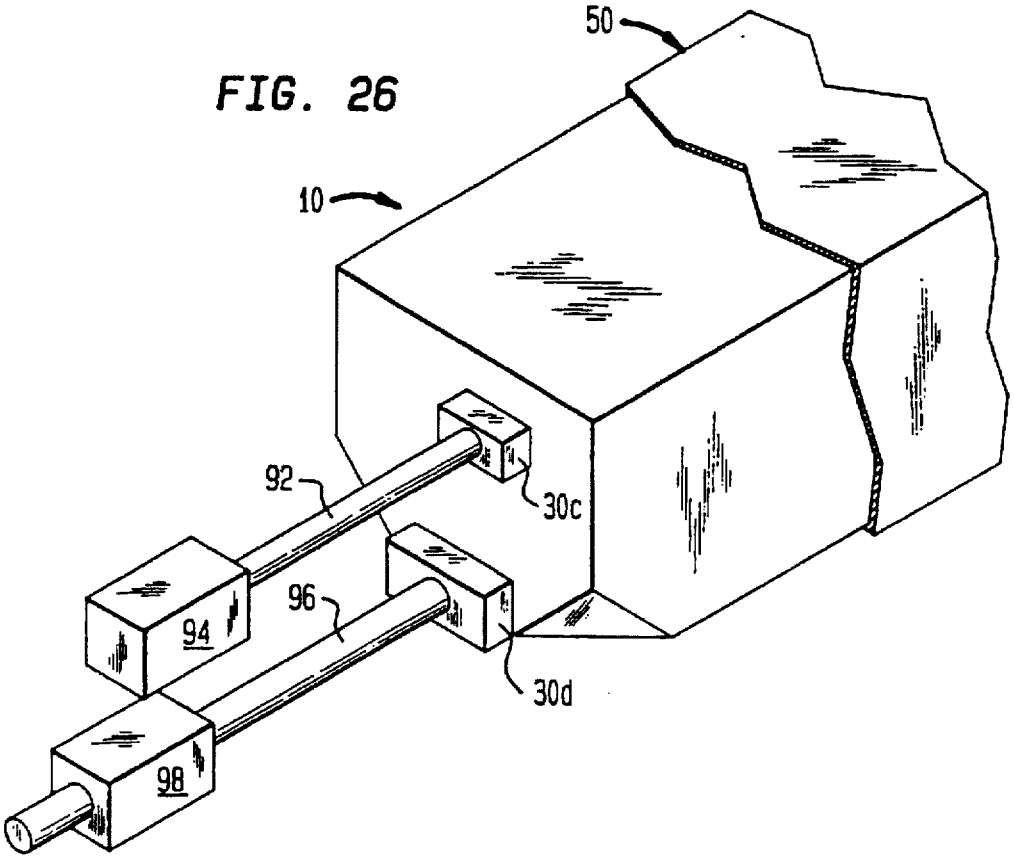

FIG. 26 is a partial perspective view generally depicting a procedure for unloading cargo from a lined cargo container.

Figure 27:
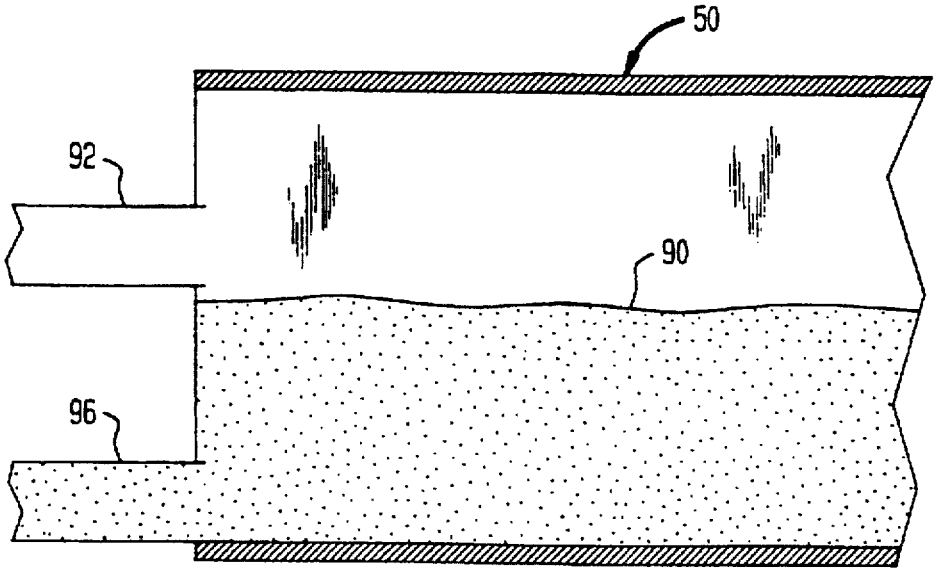

FIG. 27 is a partial sectional view also generally showing cargo being unloaded from the lined cargo container of FIG. 26.

Figure 28:
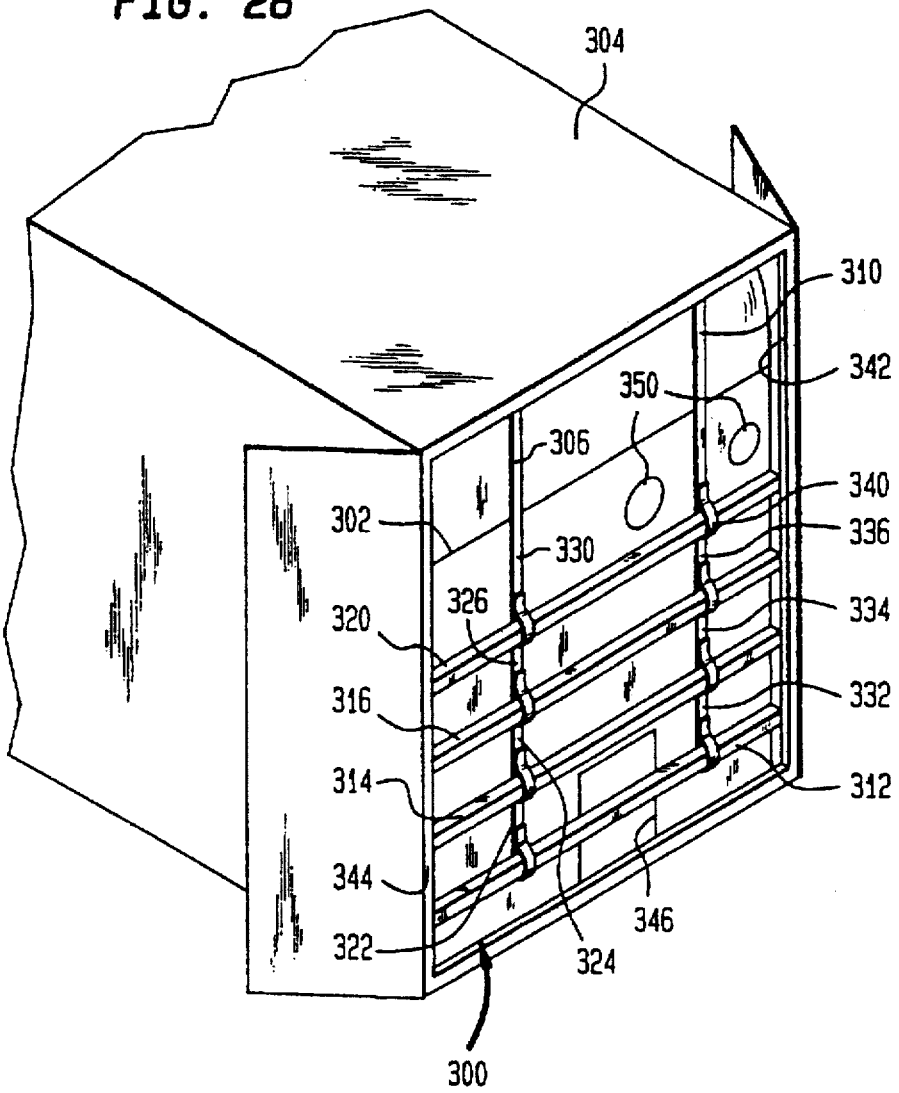

FIG. 28 shows a further system for bracing a bulkhead in a cargo container.

Figure 29:
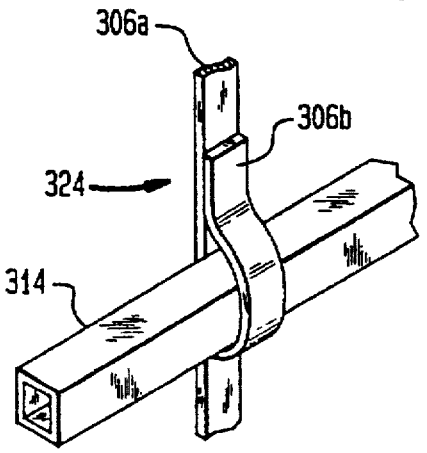

FIG. 29 shows a portion of the bracing system of FIG. 28.

Figure 30:
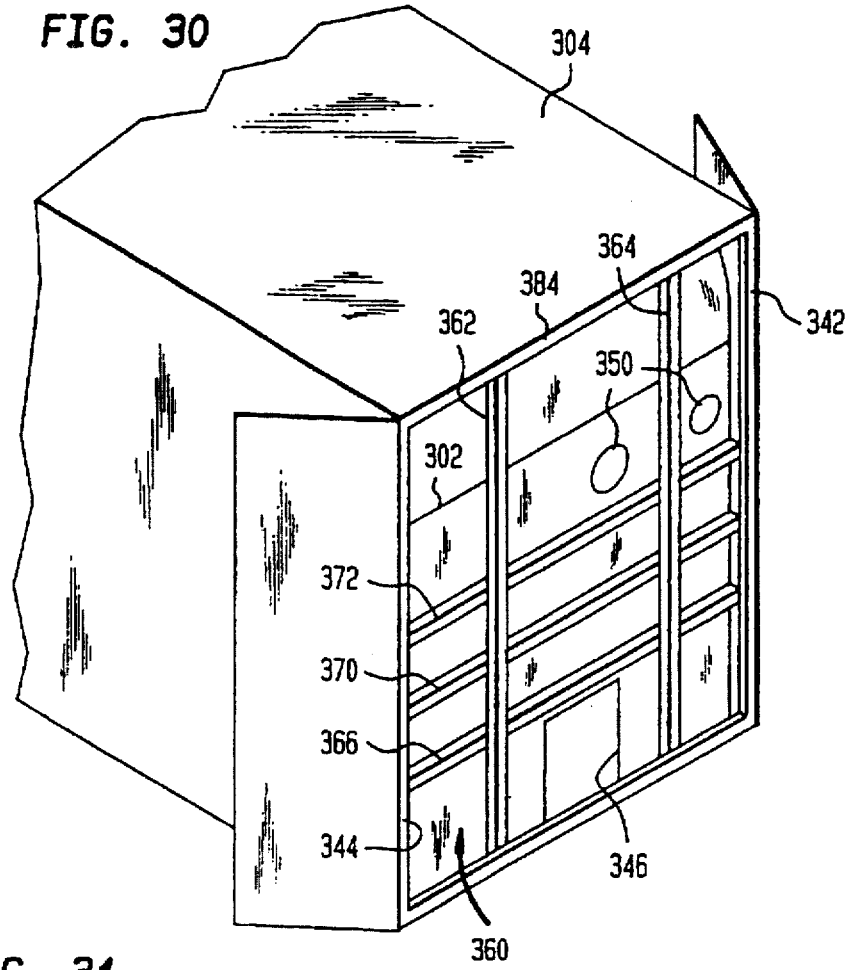

FIG. 30 illustrates another alternate system for bracing a bulkhead in a cargo container.

Figure 31:
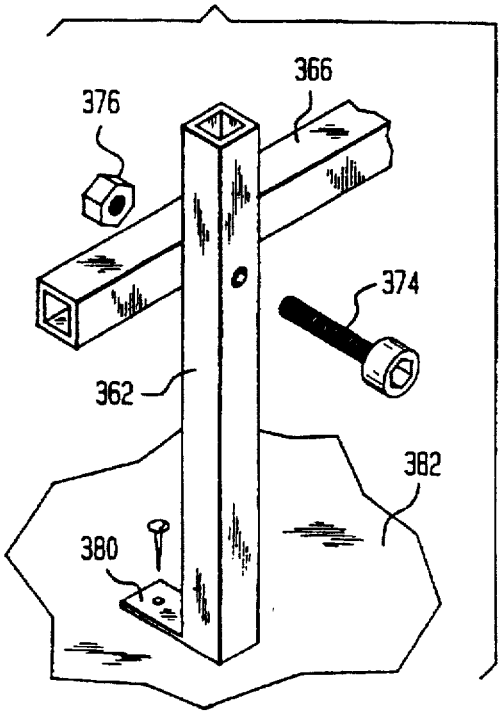

FIG. 31 is a view of a portion of the bracing system shown in FIG. 30.

Figure 32:
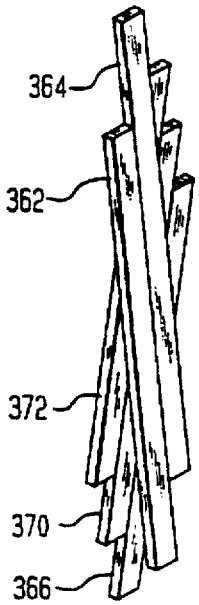

FIG. 32 shows the framework of the bracing system of FIG. 30, in a collapsed or folded condition.

Figure 33:
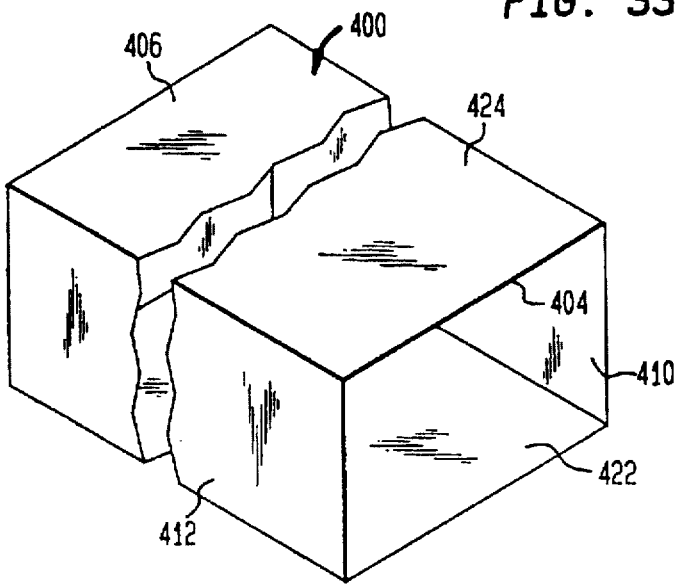

FIG. 33 shows a flexible tubular body from which a liner for a cargo container may be made.

Figure 34:
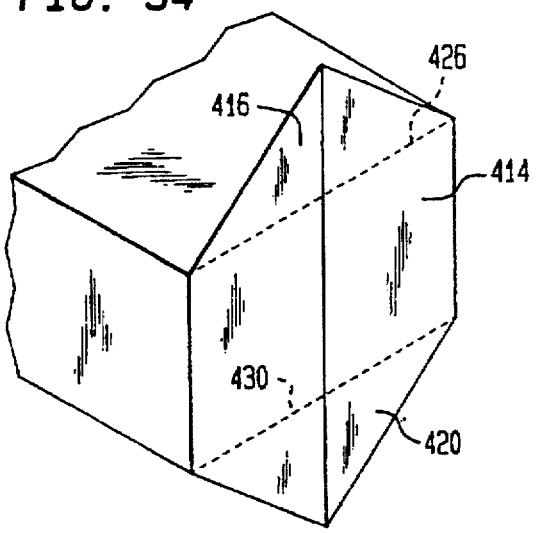
Figure 35:
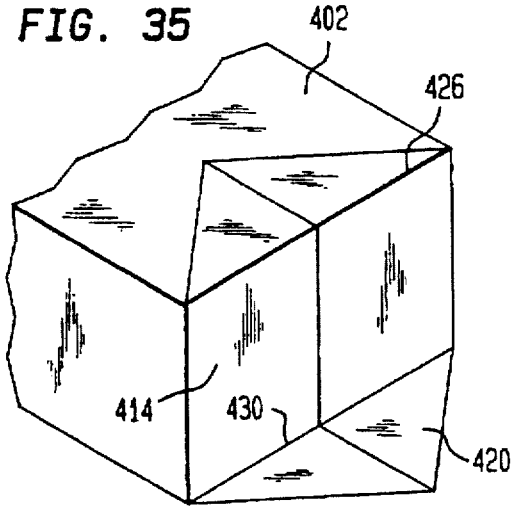

FIGS. 34 and 35 illustrate how sections of the tubular body may be folded together to form a front panel of a liner for a cargo container.

Figure 36:
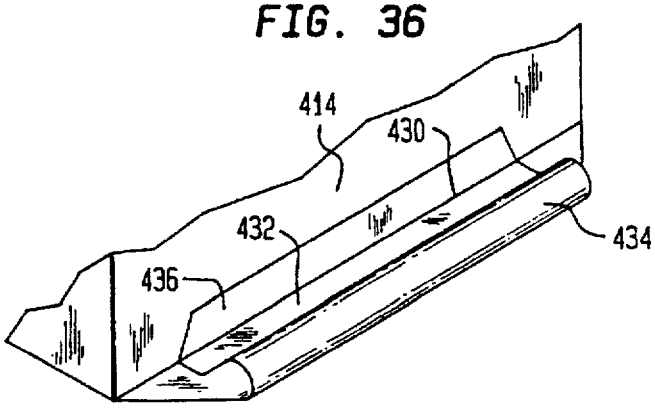

FIG. 36 shows a transverse sleeve formed along a bottom edge of the front panel of the liner.

Figure 37:
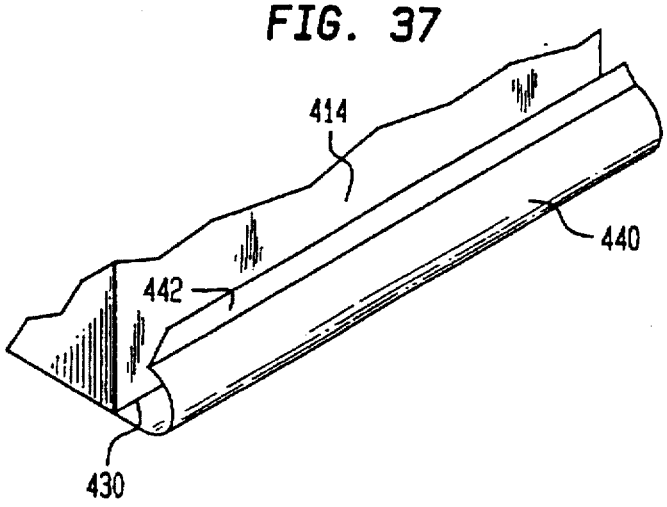
Figure 38:
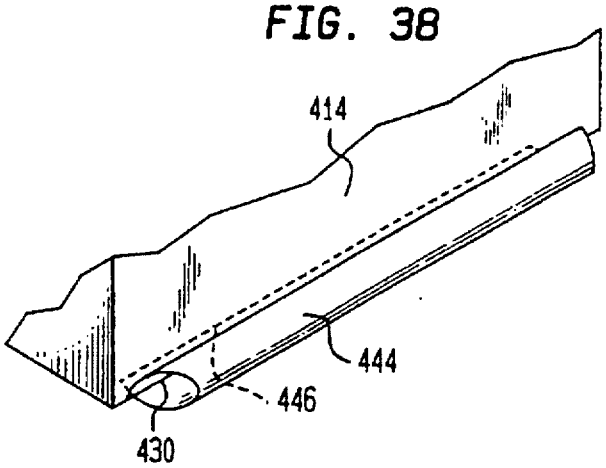

FIGS. 37 and 38 show alternate transverse sleeves also formed along the bottom, front edge of the liner.

Figure 39:
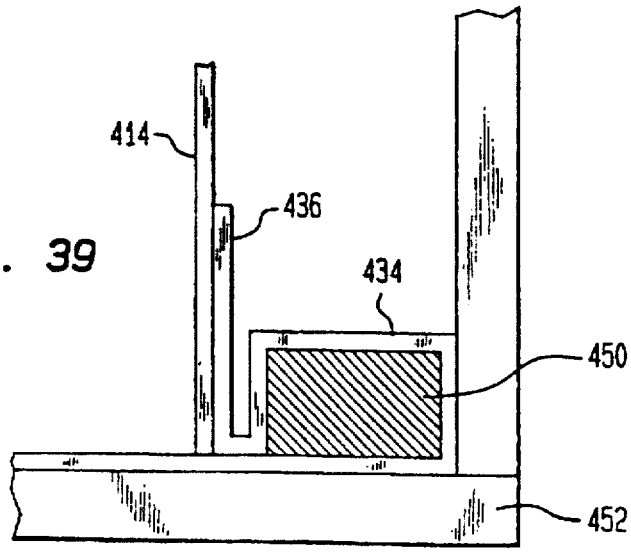

FIG. 39 shows how the transverse sleeve of FIG. 36 may be used to help secure the liner to the floor of a cargo container.

Figure 40:
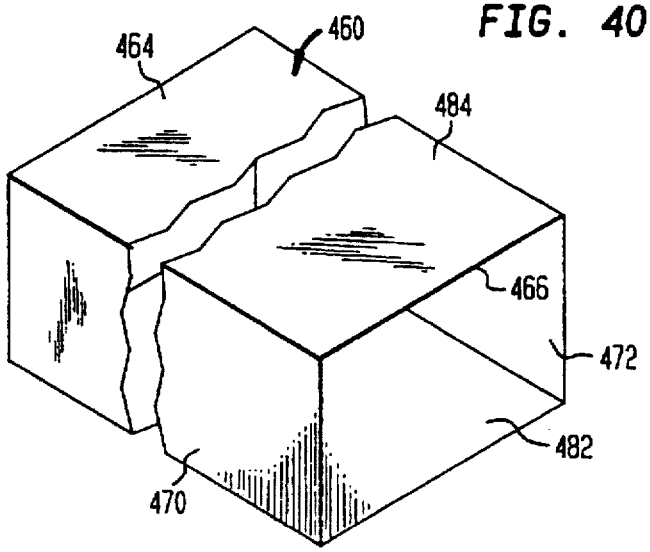

FIG. 40 also shows a flexible tubular body from which a liner for a cargo container may be made.

Figure 41:
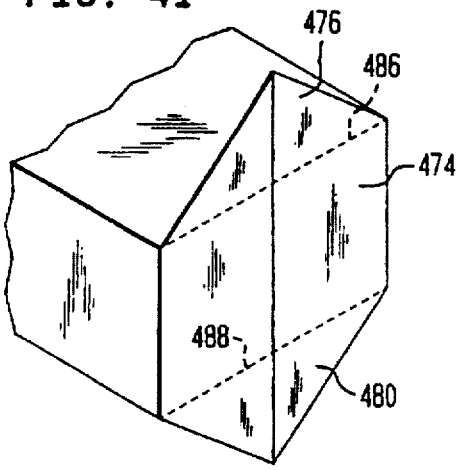

FIG. 41 illustrates how sections of the tubular body may be folded together to form a back panel of a liner for a cargo container.

Figure 42:
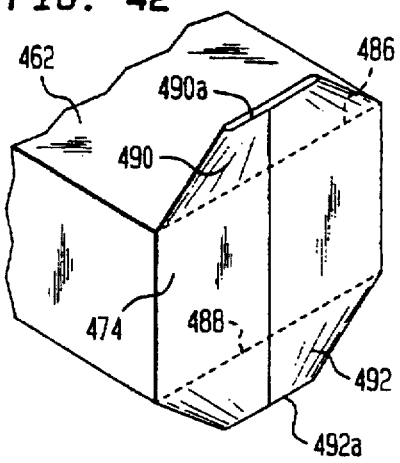
Figure 43:
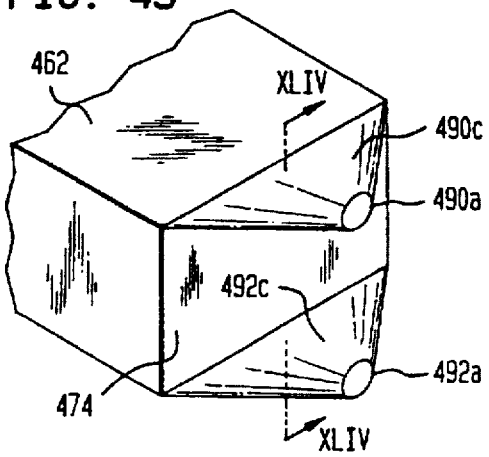

FIGS. 42 and 43 show how inlet and outlet chutes may be formed from the back top and bottom flaps shown in FIG. 41.

Figure 44:
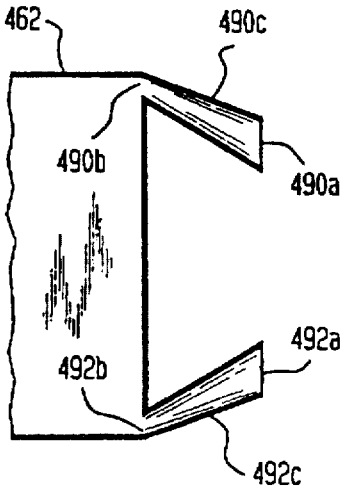

FIG. 44 is a cross-sectional vie taken along line XLIV—XLIV of FIGS. 43.

Figure 45:
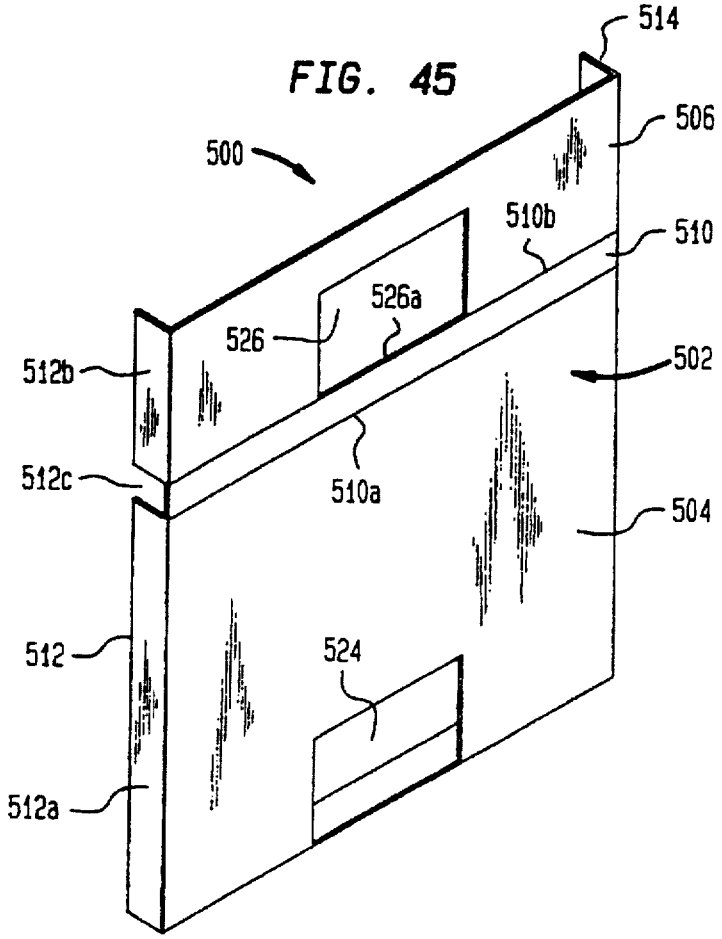

FIG. 45 is a front, perspective view of a collapsible bulkhead.

Figure 46:
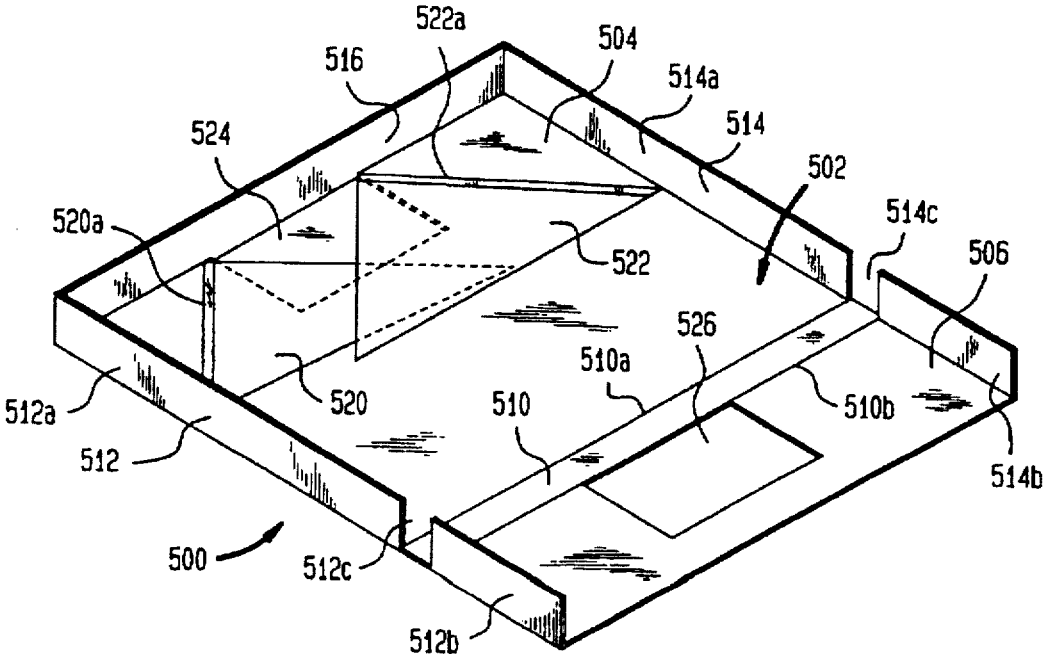

FIG. 46 is a perspective view of the back of the bulkhead of FIG. 45.

Figure 47:
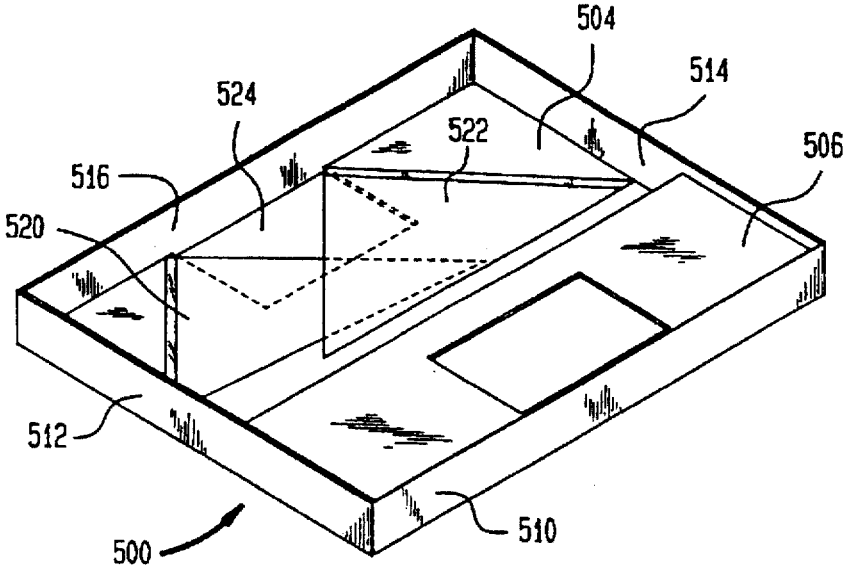

FIG. 47 is similar to FIG. 46, but shows the bulkhead in a collapsed or folded position.

Figure 48:
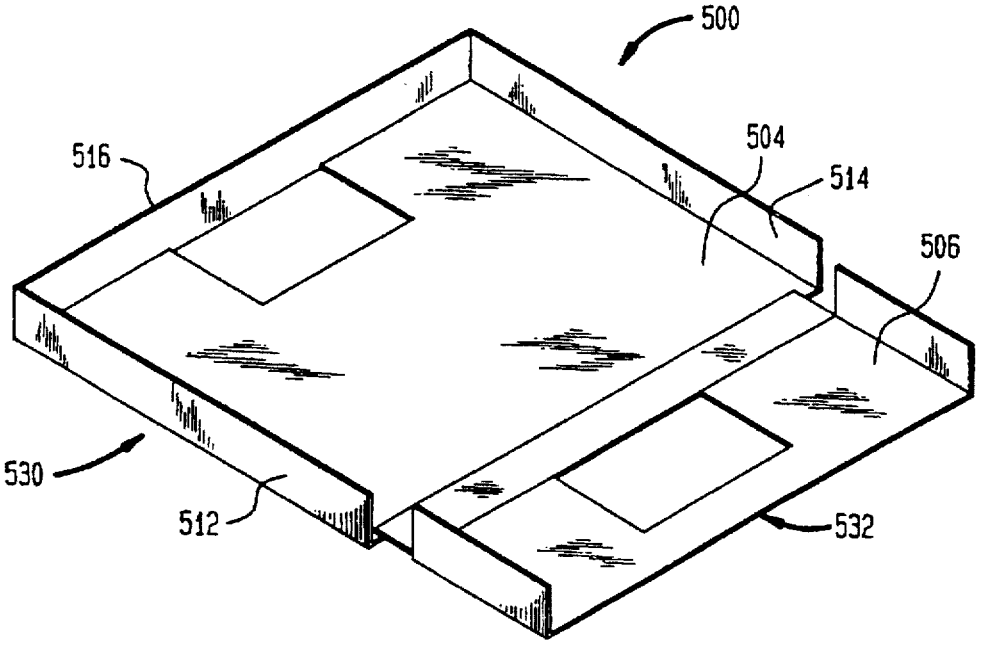

FIG. 48 shows an alternate collapsible bulkhead.

Figure 49:
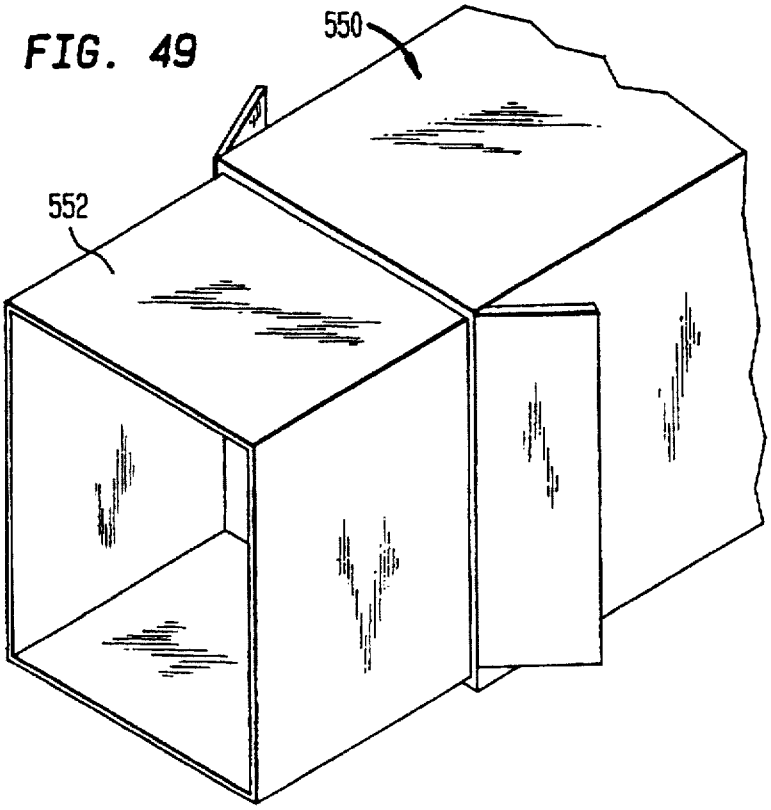
Figure 50:
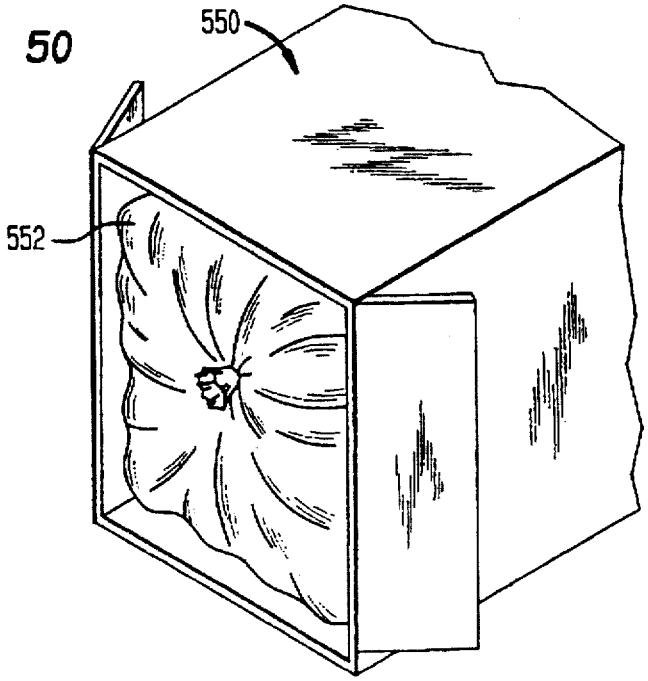

FIGS. 49 and 50 show a cargo container with liner.

DETAILED DESCRIPTION OF THE PREFERRED EMBODIMENTS

Figure 1:
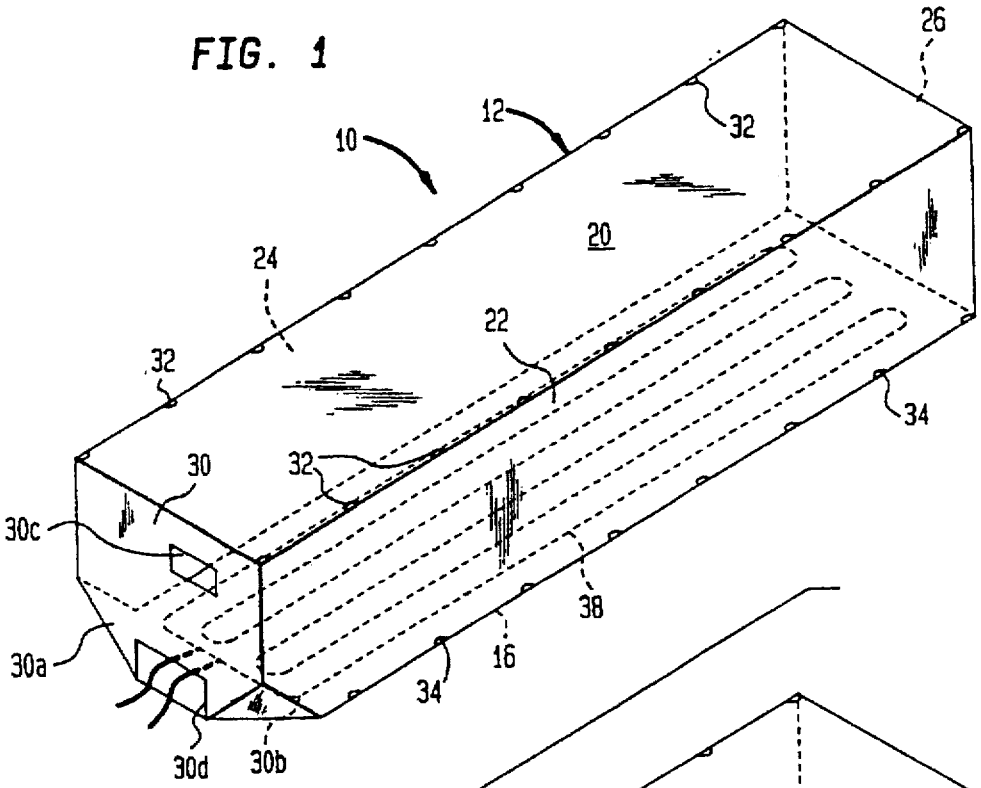
FIG. 1 is an orthogonal view of a liner for a cargo container.
Figure 2:
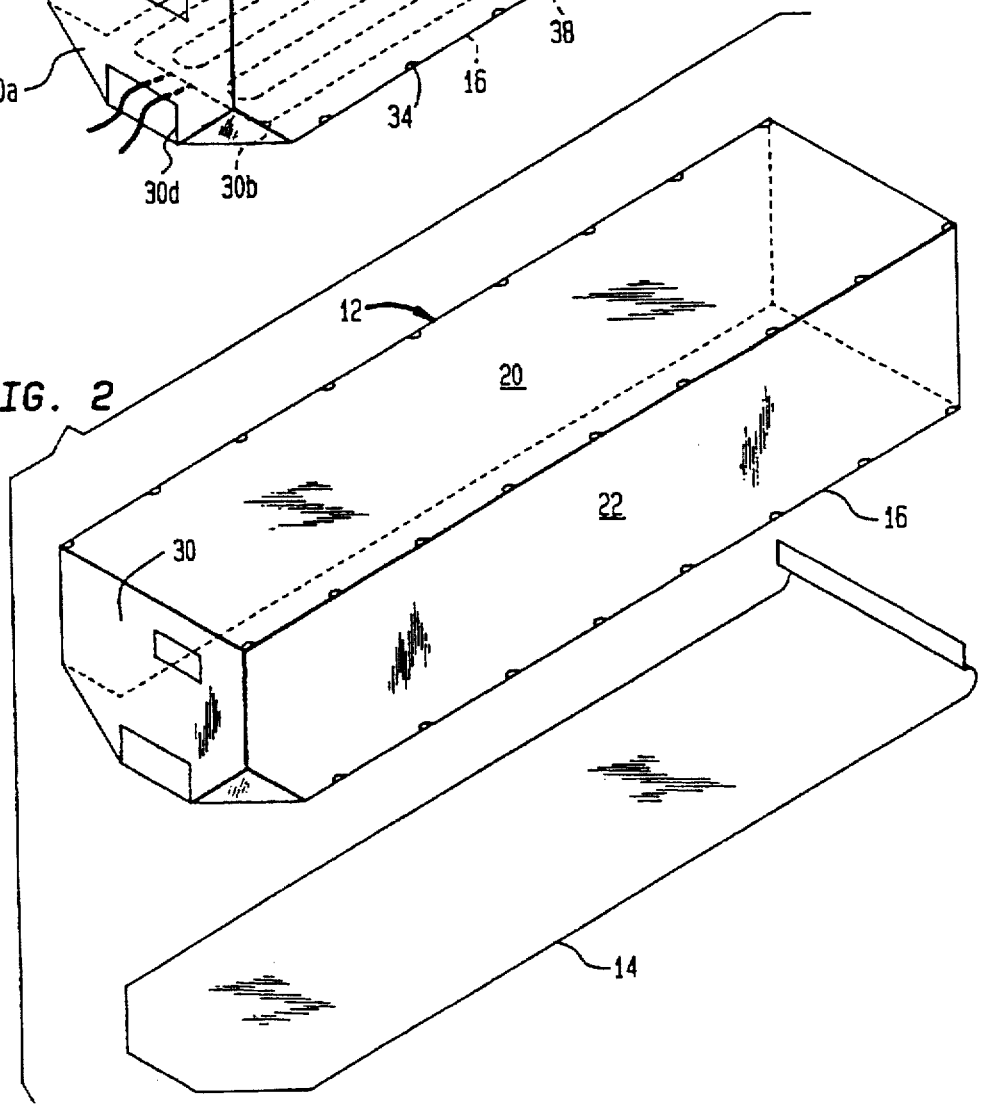
FIG. 2 is similar to FIG. 1 but shows a bottom reinforcing panel of the liner separated from the liner body.
Figure 3:
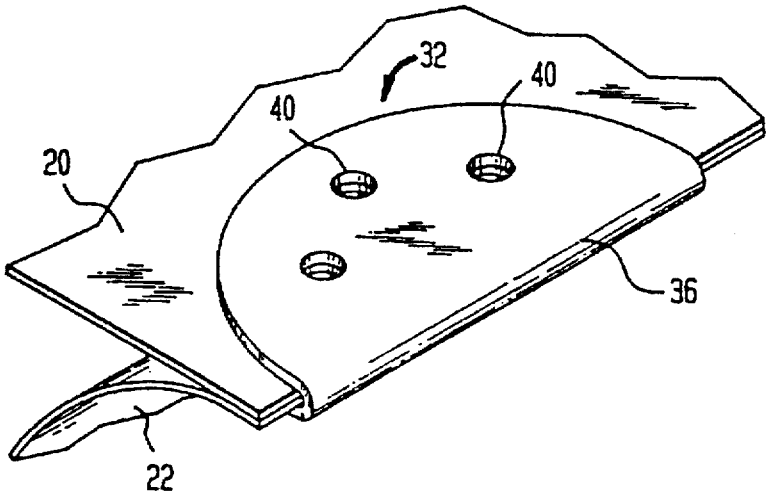
FIG. 3 is an enlarged perspective view of a portion of the liner, and particularly showing an upper connecting segment thereof.
Figure 4:
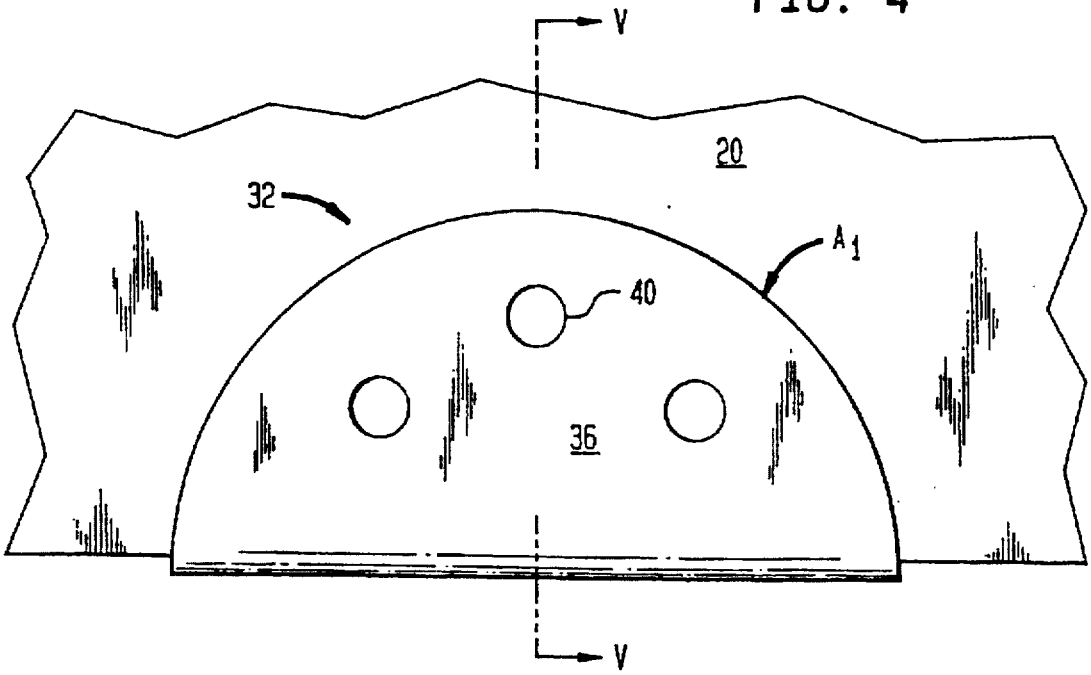
FIG. 4 is a plan view of the upper connecting
Figure 5:
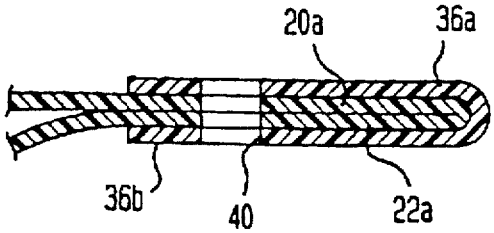
FIG. 5 is a cross-sectional view taken along line V—V of FIG. 4.
Figure 6:
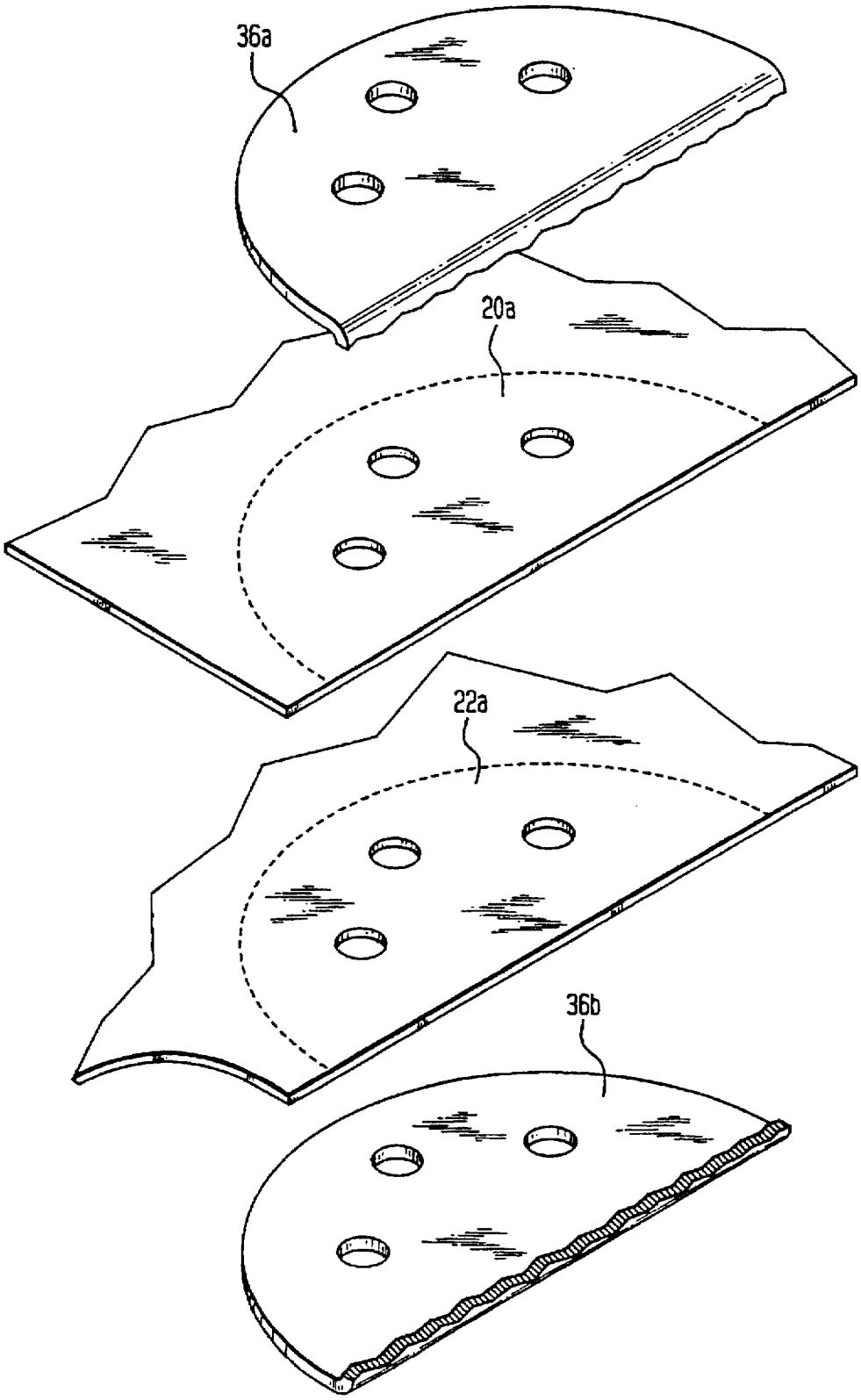
FIG. 6 is an exploded view of the upper connecting segment of FIG. 3.
Figure 7:
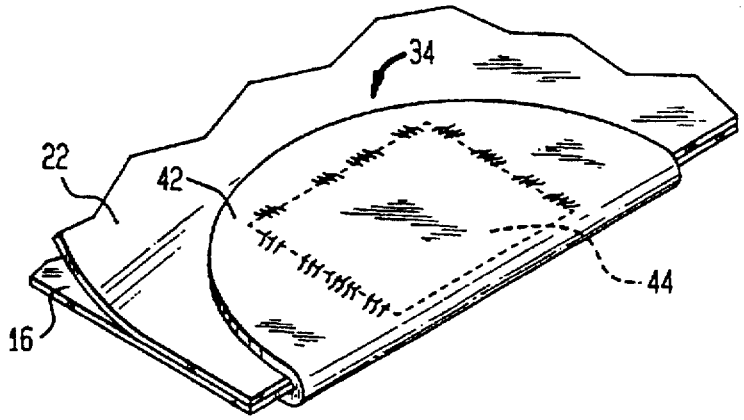
FIG. 7 is an enlarged perspective view of another portion of the liner, and particularly showing a lower connecting segment thereof.
Figure 8:
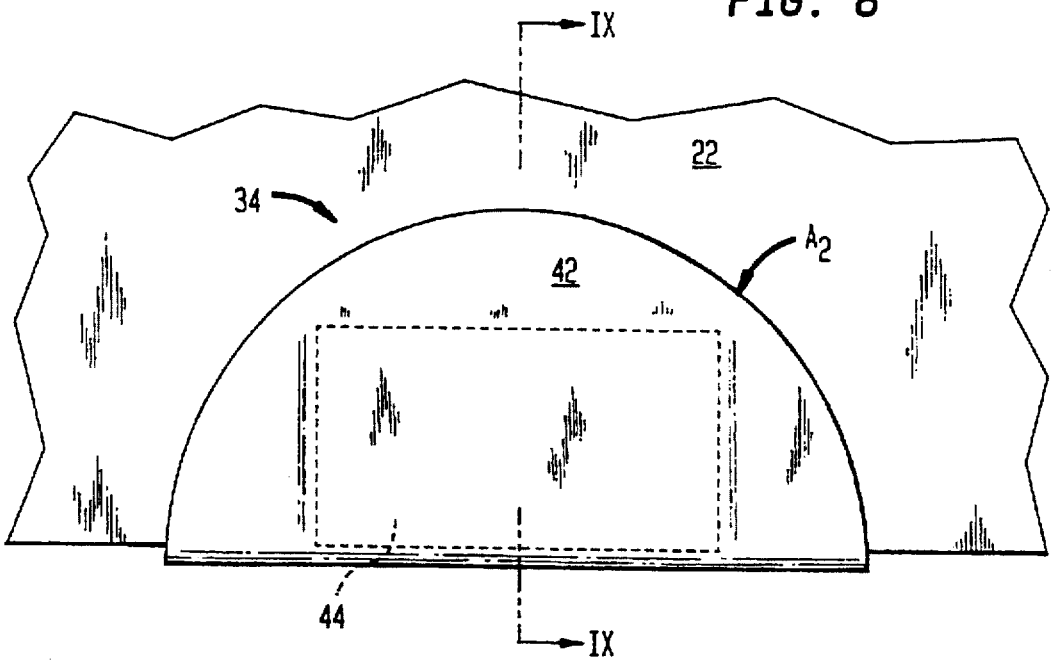
FIG. 8 is a plan view of the lower connecting segment.
Figure 9:
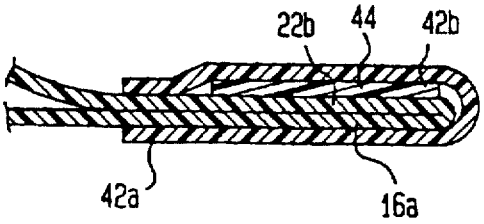
FIG. 9 is a cross-sectional view taken along line IX—IX of FIG. 8.
Figure 10:
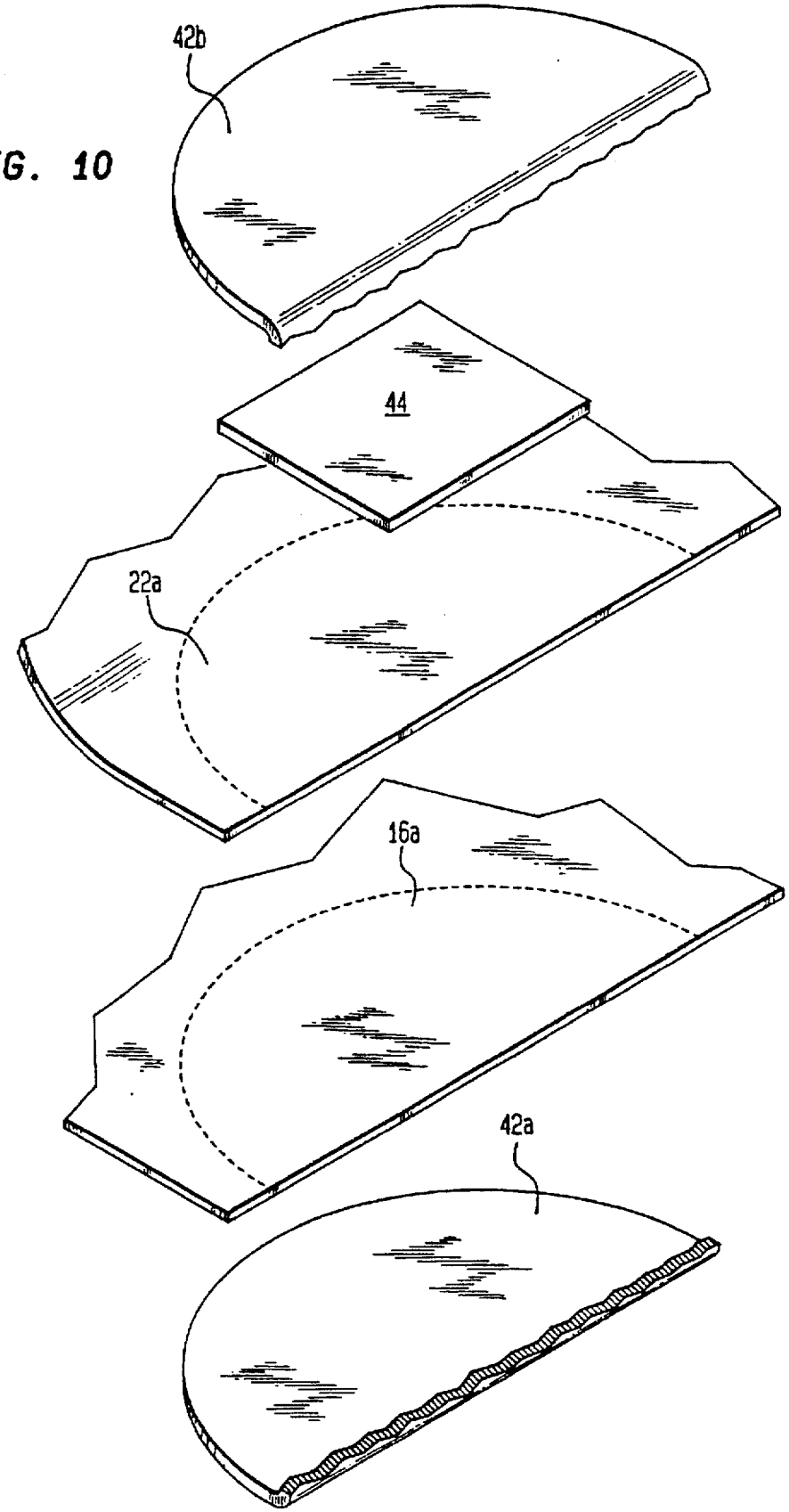
FIG. 10 is an exploded view of the lower connecting segment of FIG. 7.

FIGS. 1 and 2 illustrate an expandable and flexible liner 10 comprising liner body 12, and preferably, liner 10 further comprises reinforcing panel 14. Liner body 12, in turn, includes bottom and top panels 16 and 20, left and right side panels 22 and 24, and front and back panels 26 and 30, which are connected or formed together to form the liner body. Liner 10 is employed to line the interior of a cargo container; and when the liner is inflated or expanded inside the container, the shape of the liner partially or substantially conforms to the shape formed by the interior surfaces of that container. It should be noted, however, that the present invention may be practiced with liners that only partially conform to the shape of the interior of the cargo container with which the liner is used. For example, many liners are only half the height of the cargo containers with which they are used, and the present invention may also be employed with such liners. As illustrated in FIG. 1, liner body 12 has a hollow, substantially parallelepiped shape, although the liner body may be provided with other shapes.

Once liner 10 is positioned inside the cargo container, a bulkhead (not shown) is preferably held or positioned against back panel 30 to help support that panel. Any suitable bulkhead may be employed with liner 10, and one such bulkhead is disclosed in detail in U.S. Pat. No. 4,799,607. To accommodate this bulkhead, back panel 30 has left and right triangular shaped corner portions that form lower right and left back truncated corners 30a and b. Inlet and outlet openings 30c and d are provided in back panel 30 to conduct cargo into and out of liner 10, respectively; and these openings may be normally covered by flaps or other closure members. Chutes (not shown) may be connected to back panel 30, adjacent openings 30c and d, to facilitate loading cargo into or unloading cargo from the liner 10.

An element 38, such as an electric heating ribbon, wire, rope or pipe element may be placed inside or outside of liner 10 to keep product warm inside the liner during transportation, or to liquify product for discharging. For example, this heating element may be used to allow semi-liquid products to be loaded into and discharged from a liner, even though those products may normally have a low viscosity and normally do not flow easily, or the products solidify when cooled such as syrup, chocolate liquor, tallow, hot melt adhesives, waxes, lard and others. It should be noted that element 38 does not have to be an electric heating element; and, for instance, hot or cooled liquids may be conducted through tubes placed in liner 10 or in a cargo container, with circulation methods, from heated or cooled tanks to heat or cool, respectively, the contents of the liner, if desired.

Liner body 12 may be made in any suitable manner and from any suitable material, and for example, the liner body may be made from a thin plastic material such as polyethylene having a thickness of 7 mils. Liner body 12 may be formed from one large sheet of plastic material and folded into the desired shape. Alternatively, panels 16, 20, 22, 24 and 26 may be formed from one large sheet of material and folded into the desired shape, with back panel 30 subsequently connected to panels 16, 20, 22 and 24 to form the complete liner body. As still another example, each panel of liner body 12 may be formed separately, and the panels may be connected together to form the desired liner body. Preferably, any suitable technique may be employed to make any necessary connections between the panels of the liner body; and for instance, the liner body panels may be heat sealed together, or sewn or glued together.

Reinforcing panel 14 is secured to the bottom panel 16 of liner body 12 to reinforce the latter panel, and preferably the reinforcing panel extends under and is connected to the bottom surface of bottom panel 16. Reinforcing panel 14 extends rearward from, or from a position adjacent, the front edge of the liner, and preferably this reinforcing panel extends rearward over the complete length of bottom panel 16.

Reinforcing panel 14 may also be secured to a bottom portion of front panel 26 of liner body 12 to reinforce this area of the latter panel, and preferably the reinforcing panel extends upward approximately 25 percent of the height of panel 26. Reinforcing panel 14 may extend to a higher or lower height; and, if desired, the reinforcing panel may completely cover front liner panel 26.

Reinforcing panel 14 also may be made from any suitable material and in any suitable manner, and connected to liner body 12 in any suitable way. Preferably, in liner 10, panel 14 has a high resistance to stretching at least along the length of the liner. For example, the reinforcing panel 14 may be constructed of woven polyethylene and polypropylene fabric also having a thickness of about 7 mils. Alternatively, the reinforcing panel could be made from strips, such as 2 inch strips, of fiberglass tapes, metal reinforced tapes or polyester reinforced tapes, or the reinforcing panel could be made from coextruded cross-laminated plastic film, or coextruded, or cross laminated film.

The use of reinforcing panel 14 is not necessary to the practice of the present invention in its broadest sense, and it may be possible to provide liner 10 with the desired longitudinal strength by forming the whole liner body 12 from a high strength material that would provide the desired resistance to stretching. Using the reinforcing panel 14 is preferred, however, because this is a very simple, economical and effective way to provide liner 10 with the desired longitudinal strength.

To hold liner 10 in place in a cargo container, the liner is provided with a first, or upper, set of connecting segments 32 positioned around the top of the liner, and a second, or lower, set of connecting segments 34 positioned around the bottom of the liner. The upper connecting segments 32 are substantially identical to each other, and hence, only one of these connecting segments, illustrated in FIGS. 3–6 will be described herein in detail. This connecting segment comprises a multitude of layers of material including a portion 20a of top panel 20, a portion 22a of side panel 22, and a pair of layers 36a and b formed by a reinforcing member 36, bonded together over a given area $A_1$. The layers of connecting segment 32 are located one on top of another, and each layer of the connecting segment is bonded to each adjacent layer of the connecting segment over the entire above-mentioned given area $A_1$. At least one, and preferably a plurality of openings 40, extend through the layers of the connecting segment 32, spaced from the perimeter of the given area $A_1$. Because openings 40 are spaced from the perimeter of area A1, the layers 20a, 22a and 36a and b of connecting segment 32 form a seal between those openings and the interior of liner 10.

With the arrangement shown in the drawings, portion 20a of top panel 20 is in direct contact with and is bonded directly to portion 22a of side panel 22 over area $A_1$, a first section 36a of reinforcing member 36 is in direct contact with and is bonded to an outside surface of portion 20a of top layer 20 over area $A_1$, and a second section 36b of reinforcing member 36 is in direct contact with and is bonded directly to an outside surface of portion 22a of side panel 22 over area $A_1$. This arrangement is not necessary to the present invention is its broadest sense, however, and the reinforcing member 36 may be held between portion 20a of top panel 20 and portion 22a of side panel 22, instead of being located outside these two panel portions. Reinforcing member 36 may be made of any suitable material, although preferably this member is made of the same material from which liner body 12 is made. Moreover, as particularly shown in FIGS. 3 and 4, connecting segment 32 has a semi-circular shape. This also is not essential to the present invention, and the connecting segment may be provided with any suitable shape. For instance, the connecting segment may have a square, rectangular or semi-oval shape.

To form connecting segment 32, generally, portions 20a and 22a of top panel 20 and side panel 22 respectively are placed together, reinforcing member 36 is positioned against panel portions 20a and 22a; and these panel portions are bonded to each other and reinforcing member 36 is bonded to both panel portions 20a and 22a over area $A_1$. Then, the desired openings 40 are formed through the layers of the connecting segment. Typically, when connecting segment 32 is formed, the size of reinforcing member 36 will be larger than necessary to form layers 36a and b shown in the drawings; and after the reinforcing member is bonded to portions 20a and 22a of top and side panels 20 and 22, the excess of the reinforcing member outside the sealed area $A_1$, is cut or trimmed away.

Layers 20a, 22a, 36a and b may be bonded to each other to form connecting segment 32 in any suitable manner, although preferably these layers are all bonded together in a single, heat sealing operation. Alternatively, the layers of the upper connecting segment may be secured together by an adhesive. In addition, preferably openings 40 are at least one-half inch from the perimeter of area $A_1$.

As previously mentioned, all of the upper connecting segments 32 are substantially identical. As will be appreciated by those of ordinary skill in the art, a principle difference between the upper connecting segments on left side of the liner and those on the right side of the liner is that the former segments include a portion of top panel 20 and a portion of left panel 22, while the latter segments include a portion of top panel 20 and a portion of right panel 24. Also, liner 10 may be provided with additional upper connecting segments positioned along the upper front and back edges of the liner. The connecting segments positioned along these front and back edges of the liner may be very similar to the connecting segments illustrated in FIGS. 3–6, with the exception that the connecting segments positioned along the front upper edge of the liner would be formed, in part, by top panel 20 and front panel 26, while the upper connecting segments positioned along the upper back edge of the liner would be formed, in part, by top panel 20 and back panel 30.

Lower connecting segments 34 are substantially identical to each other, and hence only one of these connecting segments, illustrated in FIGS. 7–10, will be described herein in detail. This connecting segment comprises a multitude of layers of material, including a portion 16a of bottom panel 16, a portion 22b of side panel 22, a pair of layers 42a and b formed by first reinforcing member 42, and one layer formed by second reinforcing member 44. Layers 16a, 22b, 42a and b and 44 of connecting segment 34 are located one on top of another; and these layers are connected together over a given area $A_2$, with layer 44 sandwiched between a pair of the other layers of the connecting segments. With the arrangement shown in the drawings, portion 22b of side panel 22 is in direct contact with and is bonded directly to portion 16a of bottom panel 16, first section 42a of reinforcing member 42 is in direct contact with and is bonded directly to portion 16a of bottom panel 16, second reinforcing member 44 is located directly on top of portion 22b of side panel 22, second section 42b of reinforcing member 42 is located directly on top of second reinforcing member 44 and extends past that reinforcing member, and the portion of the second reinforcing member 42 that extends past the first reinforcing member 44 is in direct contact with and is bonded to portion 22b of side panel 22. In this way, layers 22b and 42b form a seal extending completely around second reinforcing member 44, between that reinforcing member 44 and the interior of liner 10.

The specific relative position of the various layers of connecting segment 34 that is shown in the drawings is not necessary, and for example, second reinforcing member 44 may be located between portion 22b of side panel 22 and portion 16a of bottom panel 16, or between bottom panel portion 16a and bottom section 42a of the first reinforcing member 42. Further, as particularly shown in FIGS. 7 and 8, connecting segment 34 has a semi-circular shape, and second reinforcing member 44 has a rectangular shape. None of these shapes is essential, though; and both the connecting segment 34 and the second reinforcing member 44 may have any suitable shapes. For instance, connecting segment 34 may have a square, rectangular or semi-circular shape; and second reinforcing member 44 may have a square, circular, oval or semi-circular shape.

Reinforcing members 42 and 44 may be made of any suitable materials. Preferably, reinforcing member 42 is made from the same material from which liner body 12 is made; while reinforcing member 44 is made of a high strength material. For instance, preferably reinforcing member 44 is made from a woven fabric such as nylon or polyester; and alternatively this reinforcing member could be made from fiberglass tape, metal reinforced tape or polyester reinforced tape.

To form connecting segment 34, generally, portion 16a of bottom panel 16 and portion 22b of side panel 22 are placed together, section 42a of reinforcing member 42 is positioned against bottom panel portion 16a, second reinforcing member 44 is positioned against side panel portion 22b, section 42b of reinforcing member 42 is placed over reinforcing member 44 and against side panel portion 22b; and layers 42a, 16a, 22b and 42b are bonded together. These layers may be bonded to each other in any suitable procedure; however, preferably they are all bonded together in a single heat sealing operation. Alternatively, the layers of connecting segment 34 may be adhesively secured together. Preferably, second reinforcing member 44 is at least one half inch from the perimeter of area $A_2$, maintaining a one-half inch seal between that reinforcing member and the interior of the liner 10. Commonly, when connecting segment 34 is formed, the size of first reinforcing member 42 will be larger than necessary to form layers 42a and b shown in the drawings; and after that reinforcing member is bonded in place to form the connecting segment 34, the excess portion of that first reinforcing member outside area $A_2$ is cut or trimmed away.

Figure 11:
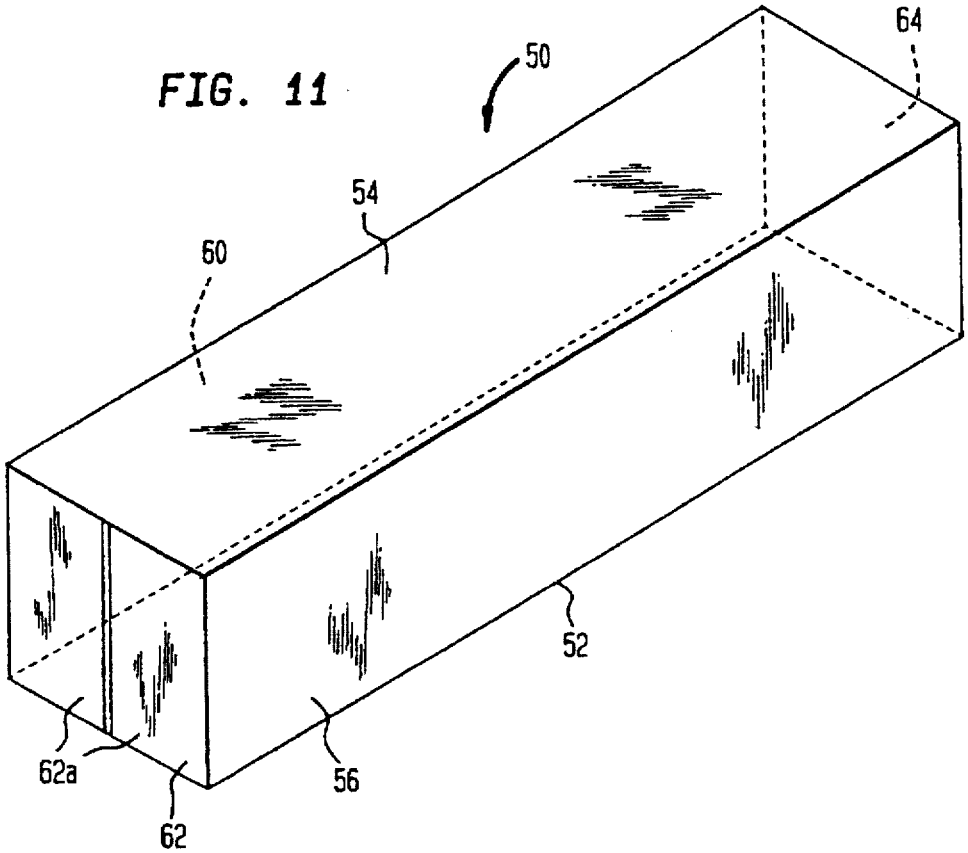
FIG. 11 shows a container with which the liner of FIG. 1 may be used.

Liner 10 may be used with any suitable cargo container; and, for example, FIG. 11 illustrates a container 50 with which the liner may be used. This container has a conventional size and shape, and in particular, includes a container body having floor and roof 52 and 54, left and right side walls 56 and 60, and back and front walls 62 and 64. Back wall 62 includes a pair of outwardly hinged doors 62a which provide access to the interior of the container.

Generally, in the inflated position of liner 10, bottom panel 16 of the liner extends over floor 52 of container 50, left and right side liner panels 22 and 24 respectively extend over left and right side walls 56 and 60 of the container, and front liner panel 26 extends over container front wall 64.

To install liner 10 inside a cargo container 50, the liner is placed inside the container, with bottom panel 16 on or over container floor 52 and with the left and right bottom edges of the liner adjacent the left and right bottom inside edges of container 50. Liner 10 may be in a collapsed, comparatively flat condition when it is placed in the container, with top panel 26 lying closely over bottom panel 16, and with side panels 30 and 32 folded inward between the top and bottom panels. The liner 10 may be placed in the container in a further folded or rolled condition, and then unfolded or unrolled into the above-mentioned comparatively flat condition.

After liner 10 is unfolded or unrolled onto floor 52 of container 50, lower connecting segments 34 are secured to that floor, and FIG. 12 illustrates how this can be done. Generally, to fasten lower connecting segment 34 to container floor 52, that connecting segment is placed on and then stapled to the container floor, with the staple 66 extending through second reinforcing member 44, preferably through a central portion thereof. In a typical application, each of the lower connecting segments 34 of liner 10 is fastened to the floor of the container. Lower connecting segments 34 may be secured in place in other ways; and for instance, these connecting segments may be nailed or screwed to the container floor 52. Stapling is preferred, however, because it can be done very easily and inexpensively, and because the staples can be removed from the connecting segments quickly and easily.

The sealed portions of connecting segment 34 outside of reinforcement member 44 provides a fail-safe method of maintaining the integrity of liner 10 even if the connecting segment breaks away from floor 52 of the cargo container. To elaborate, in case connecting segment 34 rips or tears away from any staple or nail used to fasten the connecting segment to floor 52, the outside sealed portion of the connecting segments prevents any such rip or tear from reaching or providing an opening into the interior of container liner 10. This prevents leakage of product from the liner, and also prevents any matter, which might contaminate that cargo, from entering the liner through connecting segment 34.

Supplemental connecting or securing means may be used, in addition to lower connecting segment 34, to connect liner 10 to the floor of container 50. For example, as taught in copending application No. 482,030, filed Feb. 15, 1990 for "A liner for a cargo container and a method of installing a liner inside a cargo container," the disclosure of which is herein incorporated by reference, wooden slats may be nailed to the container floor, over lower edges of left and right side panels 22 and 24 of liner 10 to hold the bottom of the liner firmly in place in the container.

Once the bottom of line 10 is secured in container 50, the liner is partially inflated therein, and this may be done by conducting a gas into the interior of the liner via inlet 30a. After the liner is partially or fully expanded inside the liner, upper connecting segments 32 are secured either to the roof 54 or to upper portions of the side walls 56 and 60 of the container, and FIG. 13 illustrates how this may be done. Generally, to fasten an upper connecting segment 32 to the container, a rope 70 is extended through one or more of the openings 40 of that connecting segment and connected to a hook 72 or similar device securely connected to or mounted on the inside of the cargo container. In a typical application, container 50 is provided with a multitude of hooks or similar fastening devices adjacent the top inside edges of the container, and each upper connecting segment 32 on liner 10 is fastened to a respective one of these hooks or fasteners. Upper connecting segments 32 may be held in place by means other than ropes, and for example, cords or chains may be employed to connect the upper connecting segments to hooks fastened around the container.

The sealed portion of connecting segment 32 outside of openings 40 provides a fail-safe method of maintainer the integrity of liner 10 in case the connecting segment rips or tears away from rope 70. More specifically, if that connecting segment rips or breaks away from rope 70, the outside sealed portion of the connecting segment insures that any such rip or tear does not reach or provide an opening into the interior of liner 10. This insures that cargo does not leak out of the liner through any such rip or tear and also prevents the cargo form being contaminated by matter leaking into the liner through such a rip or break in connecting segment 34.

Upper and lower connecting segments 32 and 34 provide a multitude of localized high strength, reinforced areas on liner 10 to connect the liner to inside surfaces of a cargo container, and consequently the liner can be tightly secured within the container. As a result, for example, the bottom of the liner can be stretched comparatively tightly across the cargo container without any, or with a minimal number of, wrinkles in the bottom panel of the liner, thus eliminating the stresses and other problems associated with such wrinkles. Moreover, even if a tear or rip develops in a connecting segment, as a result of a rope, staple or other fastener being pulled away from that connecting segment, that connecting segment will still seal the interior of the liner from that tear or rip. This, first, prevents cargo from leaking out from the interior of the liner through the tear or rip, and second, prevents the cargo from being exposed to outside contaminants through the tear or rip.

After upper connecting segments 32 are secured to container 50, liner 10 may be fully inflated, and a bulkhead may be installed in the cargo container, against back panel 30 of the liner. Further bracing may be provided to support the back panel of the liner, and liner 10 may then be fully inflated.

For example, FIGS. 14 and 15 illustrate one very effective and reliable, yet inexpensive, arrangement for bracing such a bulkhead, generally referenced at 80. This bracing system comprises vertical beams 82a–d and cross beams 84a–d. Each of vertical beams 82a–d is securely connected to container floor 52 and these beams are spaced apart along the width of bulkhead 80 and extend upward thereagainst to brace the bulkhead in container 50. Each of the beams 82a–d extends upward for at least a substantial portion of the height of bulkhead 80; and with the embodiment shown in the drawings, the length of each of the beams 82a–d is just slightly less than the inside height of container 50.

With particular reference to FIG. 14, bulkhead 80 includes an outlet opening 86 that is centrally located along a bottom portion of the bulkhead and that, in use, is aligned with outlet 30d of liner 10 to conduct cargo outward from the interior thereof. Vertical beam 82b is laterally disposed slightly to the left of the left edge 86a of outlet opening 86, and beam 82a is laterally disposed between beam 82b and the left edge 80a of bulkhead 80. Analogously, beam 82c is laterally disposed slightly to the right of the right edge 86b of outlet opening 86, and beam 82d is laterally disposed between beam 86c and the right edge 80b of bulkhead 80. With the specific arrangement shown in the drawings, beam 82b is spaced from the left edge 80a of bulkhead 80 a distance equal to about one-third of the width of the bulkhead, and beam 82a is spaced to the left of beam 82b a distance equal to about two-thirds of the distance between that latter beam 82b and the left edge 80a of the bulkhead. Similarly, beam 82c is spaced from the right edge of bulkhead 80 a distance equal to about one-third of the width of the bulkhead, and beam 82a is spaced to the right of beam 82c a distance equal to about two-thirds of the distance between that beam 82c and the right edge 80b of the bulkhead.

Cross beams 84a and b are connected to beams 82a and b to help hold these latter beams upright, and preferably beams 84a and b are parallel to each other. Cross beams 84c and d are connected to beams 82c and d to help hold these latter beams upright, and preferably beams 84c and d are parallel to each other. Beams 82a–d and beams 84a–d can be constructed in modular form sets to save time and labor costs. Preferably beams 84a–d are horizontal, although, alternatively, they may be at an angle to the horizontal. As shown in FIG. 14, beam 84a is connected to beams 82a and b about halfway along the height of the beams, and beam 84b is connected to beams 82a and b at about one-third of the distance from bottom edge 80c of bulkhead 80 to beam 84a. Likewise, beam 84c is connected to beams 82c and d about halfway along the height of those beams, and beam 84d is connected to beams 82c and d at about one-third of the distance from bottom edge 80c of bulkhead 80 to beam 84c.

Beams 82a–d and 84a–d may be made of any suitable materials, although preferably they are all wood beams. With the particular arrangement shown in the drawings, each of the vertical beams 82a–d has nominal dimensions of two inches by two inches by approximately eight feet, and each of the cross beams 84a–d has nominal dimensions of one inch by six inches by twenty-one inches. The preferred dimensions of beams 82a–d and 84a–d may be different, though, depending on the height and width of the cargo container with which the beams are used. Cross beams 84a–d may be connected to vertical beams 82a–d in any suitable manner, although preferably these beams are nailed together. Likewise, vertical beams 82a–d may be connected to container floor 52 in any acceptable way; and, for instance, a multitude of angle irons, one of which is shown at 88 in FIG. 16, may be connected to container floor 52 and to beams 82a–d by means of self-tapping screws 90 or other suitable means to connect those beams to the container floor.

FIG. 17 illustrates an alternate means, generally referenced at 100, for bracing bulkhead 80 in container 50, and in which flexible straps, which may be made of metal or non-metal materials, are substituted for the wood beams shown in FIG. 14, eliminating the need and the cost of those wood beams. Bracing means 100 includes a plurality of generally vertical, upwardly extending straps 102 and 104, and a plurality of laterally extending straps 106 and 110. Straps 102 and 104 are connected to and extend between the floor and the ceiling of the body of container 50, and are held against bulkhead 80; and straps 106 and 110 are connected to and extend between the left and right side walls of the container body, and also are held against the bulkhead.

More specifically, each of the upwardly extending straps 102 and 104 includes a bottom portion, a top portion and a main portion; and in FIG. 17, the bottom, top and main portions of strap 102 are referenced as 102a, b and c respectively, and the bottom, top and main portions of strap 104 are referenced as 104a, b and c respectively. The bottom portion of each strap 102, 104 horizontally extends along and is connected to the floor of the container body, the top portion of each of these straps horizontally extends along and is connected to the ceiling of the container body, and the main portion of each strap 102, 104 is connected to and extends between the bottom and top portions of the strap and is held against bulkhead 80.

Each of the laterally extending straps 106, 110 includes a left portion, a right portion, and a main portion; and in FIG. 17, the left, right and main portions of strap 106 are referenced at 106a, b and c respectively, and the left, right and main portions of strap 110 are referenced at 110a, b and c respectively. The left portion of each lateral strap extends against and is connected to the left side wall of container 50, the right portion of each lateral strap extends against and is connected to the right side wall of the container, and the main portion of each lateral strap is connected to and extends between the left and right connecting portions of the strap, and is held against bulkhead 80.

The straps used in bracing means 100 may be made of any suitable material; and for instance, the straps may be made of a flexible, high strength metal. Alternatively, these straps may be constructed of woven polyethylene and polypropylene, or the straps may be made from strips, such as 2" strips, of fiberglass tapes, metal reinforced tapes or polyester reinforced tapes. As still additional example, the bracing straps could be made from coextruded cross-laminated plastic film, or co-extruded, or cross-laminated film. Typically, metal straps are preferred because they can be made with a relatively high resistance to stretching. Metal straps of various width and thicknesses may be used in bracing system 100; and for instance, the width of the straps may be between ¾" and 3" or 4", the thicknesses of the straps may be between 20 and 80 mills, and each strap may have a break strength of between 2,000 and 60,000 pounds.

The straps of bracing means 100 may be connected to the body of container 50 in any acceptable manner; and as an example, and with reference to FIG. 18, self drill or self tapping screws 112 and 114 may be used to secure strap 110 to the container body. To allow this, the strap and the container body are provided with suitable openings to receive those screws. These openings may be formed in the container body and the bracing straps before the straps are positioned against the container body, or self tapping screws may be used to form those openings as the bracing straps are screwed to the container body. Washers, such as washer 116 may be disposed between the bracing straps and the heads of the screws used to connect those straps to the container body. As will be understood by those of ordinary skill in the art, the straps of bracing means 100 may be secured in place in other ways; and, for example, depending on the material from which the straps are made and the specific material to which the straps are secured, the straps may be nailed, stapled, welded or bolted in place.

FIG. 19 illustrates three alternate ways for connecting a strap to a container body, specifically a side wall 120 thereof. With the arrangement shown at 122, an end portion of strap 124 is folded over and against itself, forming a double thickness section 126; and a portion of this section 126 is held against the container side wall, inside a vertical groove 130, and a self tapping screw 132 is threaded through this double thickness section and into the container side wall, connecting the strap thereto. Similarly, with the arrangement shown at 134, an end portion of strap 136 is folded over and against itself, forming double thickness section 140; and a portion of this section 140 is held against the container side wall, specifically a surface 142 thereof, and a self tapping screw 144 is threaded through this double thickness section and into the container side wall, connecting the strap thereto.

With both of the procedures discussed immediately above, as the self tapping screw is threaded through the bracing strap and into the container side wall, that screw forms aligned openings in the strap and the container side wall. Also, washers, such as square washer 146 or round washer 150, may be disposed between the bracing strap and the head of a screw used to connect the strap to the container side wall.

The double thickness sections 126 and 140 of straps 124 and 136 respectively, provide additional strength to prevent the screws 132 and 144 from tearing the bracing straps. As indicated above, preferably double thickness sections 126 and 140 are formed by folding over end portions of straps 124 and 136 respectively. Double thickness sections may be formed in other ways; and, for example, a separate piece of material may be placed over and secured to an end portion of a strap to form a section having a double thickness.

With the connecting arrangement shown at 150, an opening (not shown) is formed in the container side wall, and a through hole 192 is formed in an end portion of strap 194. Strap 154 is placed against the container side wall with these two openings aligned, and a screw 156 is threaded through these two openings to connect the strap to the container side wall. A washer 158 may be positioned between the end portion of strap 154 and the head of screw 156.

Bracing means 100 may include any suitable number of upwardly extending straps and any suitable number of laterally extending straps, and these straps may be arranged in various patterns. The preferred number and pattern of the bracing straps depends in part on the specific bulkhead with which the straps are used, and more specifically, on the location of the inlet and discharge openings in that bulkhead. For instance, with the bulkhead 80 shown in FIG. 17, and which includes a central bottom discharge opening 86, strap 102 extends upwards, substantially vertically, adjacent and laterally to the left of the left edge of the discharge opening, and strap 104 extends upward, substantially vertically, adjacent and laterally to the right of the right edge of the discharge opening. Moreover, as shown in FIG. 17, lateral straps 106 and 110 are substantially horizontal; however, this is not necessary and instead these straps may extend across bulkhead 80 at an acute angle to the horizontal, either parallel to each other, or forming an x across the bulkhead.

FIG. 20 shows a cargo container 50 having an alternate bulkhead 160 having two lower discharge openings 162 and 164. The embodiment of bracing means 100 used with this bulkhead includes three upwardly extending straps 166, 170 and 172, and three laterally extending straps 174, 176 and 180. Strap 166 extends upwards, substantially vertically and laterally to the left of the left discharge opening 162; strap 170 extends upwards, substantially vertically and laterally between the discharge openings 162 and 164; and strap 172 extends upwards, substantially vertically and laterally to the right of the right discharge opening 164. Strap 176 extends horizontally across the bulkhead, generally midway between the top and bottom edges of the bulkhead; strap 166 extends horizontally, slightly above the top edges of the discharge openings; and strap 180 extends horizontally slightly below the bottom edge of inlet openings 182.

FIG. 21 shows cargo container 50 having a third bulkhead 184 that forms a comparatively wide discharge outlet 186. The embodiment of bracing means 100 used with this bulkhead includes first and second upwardly extending straps 188 and 190, and first, second and third lateral straps 192, 194 and 196. Strap 188 extends upwards, laterally between the left edge of the bulkhead and the left edge of opening 186; and strap 190 extends upwards, laterally between the right edge of the bulkhead and the right edge of opening 186. Straps 192, 194 and 196 horizontally extend across the bulkhead and are vertically spaced apart a distance about ¼ the height of the bulkhead itself.

Bracing means 100 maintains a bulkhead in position inside cargo container 50, and allows the bulkhead to withstand the pressure of the commodity inside the liner 10 even when the cargo container is tilted to angles of from 45° to 75° to discharge the cargo from the liner. Bracing means 100 is simple to use, economical and very effective. The desired bracing straps may be connected to the container body by pre-drilling suitable holes in the straps and the container body, and then using screws or bolts to connect the straps to the container body. Further, if steel bracing straps are used, these straps may be securely connected to the container body by means of self tapping screws, eliminating the need to pre-form any holes in the straps or in the container body.

Figure 22:
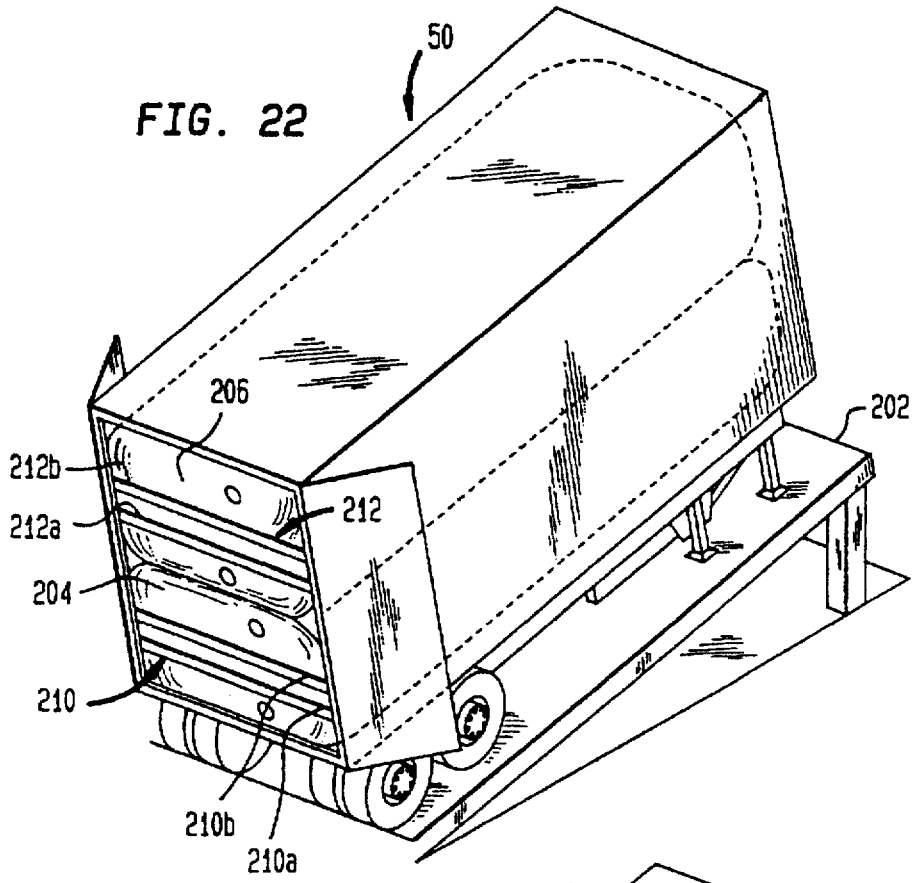
Figure 23:
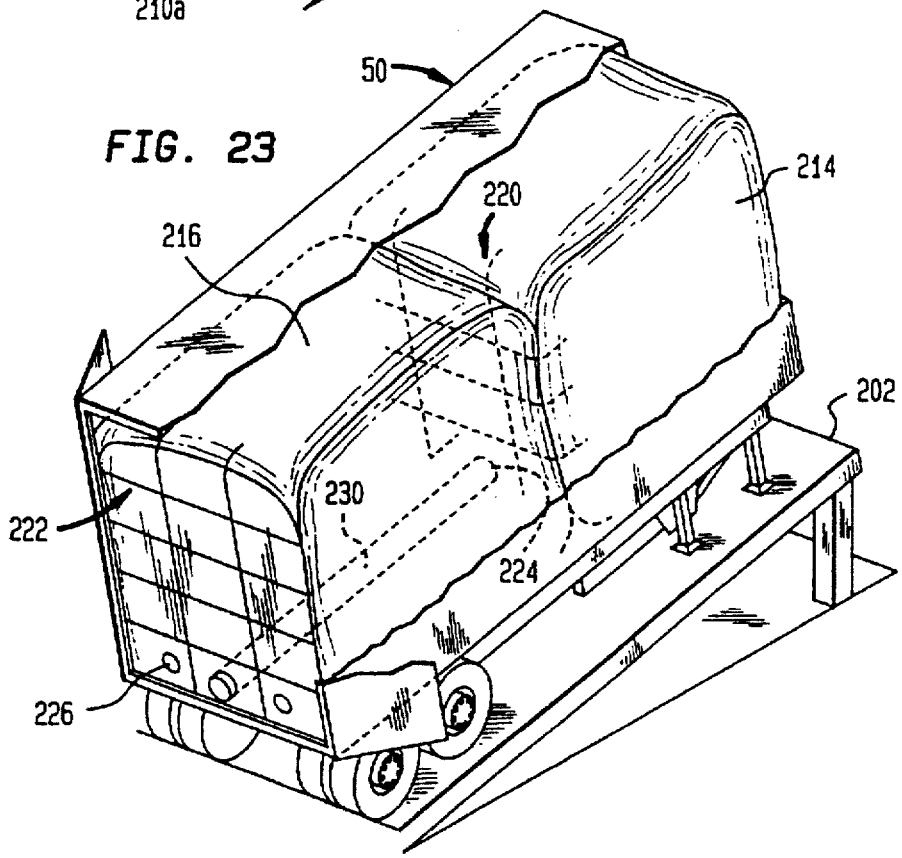
Figure 24:
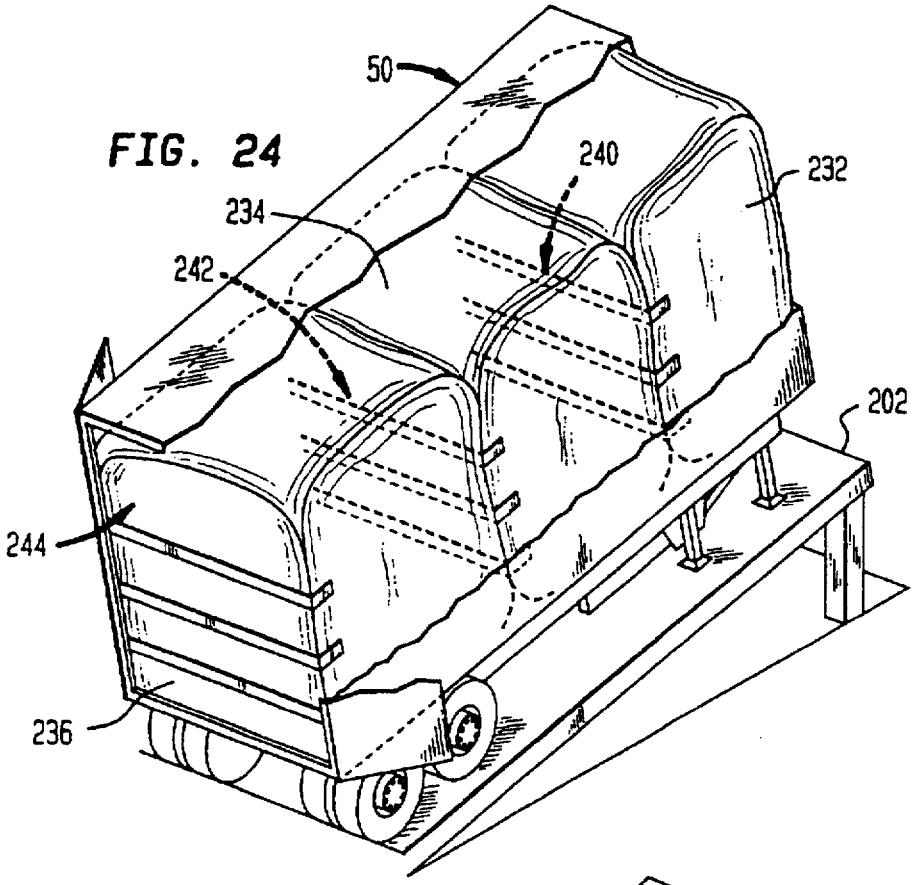

Indeed, bracing means 100 works so effectively that the bracing means may, under some circumstances, eliminate the need for a bulkhead to support a liner inside cargo container 50. This, in turn, increases the number of ways in which a plurality of liners may be held inside the cargo container; and for example, FIGS. 22–25 illustrate four arrangements for positioning and holding a plurality of liners inside cargo container 50. Each of FIGS. 22–24 shows a cargo container 50 including a plurality of flexible and expandable liners secured in the cargo container, and a plurality of bracing means, with each bracing means engaging and supporting a respective one of the liners inside the cargo container. FIGS. 22–24 also show the cargo container mounted on a tiltable platform 202 that may be used to tilt the container to unload cargo from the liners inside the cargo container.

FIG. 22 shows cargo container 50 holding two liners 204 and 206, one on top of the other, and including two bracing systems 210 and 212, with each bracing system engaging and helping to support a respective one of the liners. More specifically, liner 204 is positioned on and supported by the floor of the container body, and liner 206 is positioned on and supported by liner 206. Bracing system 210 includes a plurality of straps 210a and 201b connected to the container body and extending across a back panel of liner 204 to hold the liner inside the container body, and bracing system 212 includes a plurality of straps 212a and b connected to the container body and extending across a back panel of liner 206 to hold that liner inside the container body.

For example, with the cargo container shown in FIG. 22, liquids may be carried in the bottom liner, and the top liner may carry light weight products such as styrofoam or peanuts in shells. The top liner prevents the bottom liner from surging, by occupying the space inside the cargo container above the bottom liner. Typically, liquid cargo would be discharged from the lower liner before cargo is discharged from the upper liner.

FIG. 23 shows cargo container 50 holding two liners 214 and 216, one in front of the other, and also including two bracing systems 220 and 222, each of which engages and supports a respective one of the liners. Both of the liners 214 and 216 are positioned on and supported by the floor of the cargo container, and liner 214 is located forward of liner 216. Bracing system 220 includes a plurality of straps connected to the container body and extending, preferably both vertically and horizontally, across a back panel of liner 214 to hold the liner inside the container body; and bracing system 222 includes a plurality of straps connected to the container body and extending, also preferably both vertically and horizontally, across a back panel of liner 216 to hold the liner inside the container body.

Each of the liners 214 and 216 includes a respective discharge outlet 224 and 226 to discharge cargo from the liner; and the cargo container 50 further includes a discharge conduit 230 to allow cargo to be discharged from liner 214 while liner 216 is still inside the cargo container body, either before or after the latter liner is itself emptied of cargo. Conduit 230 is in communication with discharge outlet 224 of liner 214 and extends forward therefrom, through liner 216, to discharge cargo from the first liner and through the second liner. Conduit 230 may be made, for example, of a metal or solid plastic. Conduit 230 may also be flexible such as a plastic roll-out sleeve that can be rolled out to the rear of the container after the rear compartment liner is emptied.

FIG. 24 shows cargo container 50 holding three liners 232, 234 and 236 arranged in series in the container, from the front to the back thereof, and three bracing systems 240, 242 and 244, each of which engages and supports a respective one of the liners inside the cargo container. Each of the liners 232, 234 and 236 is positioned on and supported by the floor of the cargo container; and liner 232 is located in a forward portion of the cargo container, liner 234 is located immediately rearward of liner 232, and liner 236 is located immediately rearward of liner 234. Bracing system 240 includes a plurality of straps connected to the container body and extending across a back panel of liner 232 to hold the liner inside the container body, bracing system 242 includes a plurality of straps connected to the container body and extending across a back panel of liner 234 to hold the liner inside the container body, and bracing system 244 includes a plurality of straps connected to the container body and extending across a back panel of liner 236 to hold that liner inside the container body. Each of the liners 232, 234 and 236 may be provided with closed end caps with threaded fittings, or flexible loading and unloading chutes that can reach the rear of the container so that cargo can be conducted into the liner and subsequently discharged therefrom.

Figure 25:
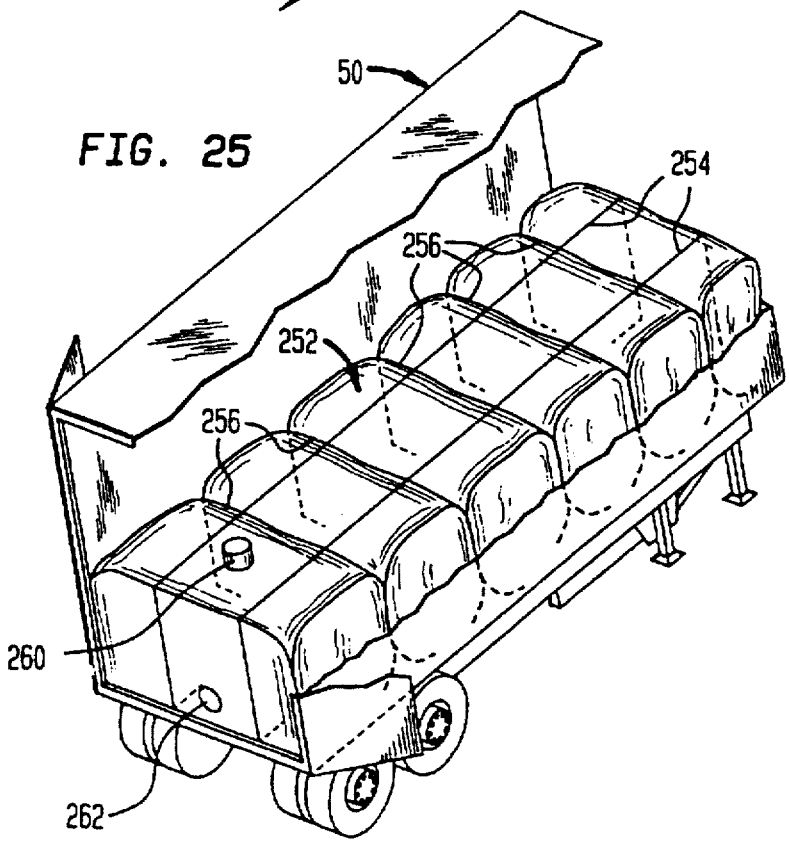

FIG. 25 shows container 50 having liner 250 and bracing system 252. This bracing system is especially well suited for supporting a liner that holds a liquid or semi-liquid because the bracing system inhibits or prevents liquids from surging inside the liner. More specifically, bracing system 252 includes a plurality of longitudinally extending straps 254 and a multitude of transversely extending straps 256. Each of the longitudinal straps is connected to the container floor, beneath a rearward portion of liner 250, and the strap extends upwards against a back panel of the liner and forwards, against the top of the liner, to a front thereof. Each of the longitudinal straps then extends downward, forward of a front panel of the liner and is secured to the container floor, underneath a forward portion of the liner.

Each of the transversely extending straps 256 is connected to the container floor, beneath a right portion of the liner 250, extends upwards along the right side of the liner, and then extends over and against the top of the liner to the left side thereof. Each of the transversely extending straps 256 then extends downward, along the left side of the liner and is connected to the container floor, beneath a left portion of the liner. A filler spout 260 is connected to the liner 250 to conduct cargo into the liner, and an unloading spout 262 is connected to the liner to discharge cargo therefrom.

With each of the cargo containers shown in FIGS. 22–25, one or more bulkheads may be used, if desired, to further support one or more of the liners inside the cargo container, or to facilitate loading cargo into or unloading from the liners inside the cargo container. To simplify the illustrations, these bulkheads are not shown in FIGS. 22–25.

With reference to FIGS. 1 and 11, once liner 10 is fully secured inside container 50, cargo may be loaded into the lined container, also via inlet 30c. To unload the cargo from container 50, outlet 30d is opened and the front end of the container is raised so that the cargo slides rearward and out through opening 30d in back panel 30.

FIGS. 26 and 27 generally illustrate an alternate method for discharging cargo from container 50. In accordance with this method, a gas is conducted into liner 10 through inlet port 30c to increase the pressure on or above the bulk cargo 90 therein, and gas and substantially the complete supply of bulk cargo inside the liner is drawn out therefrom through liner outlet 30d, without tilting container 50 or liner 10. It has been found that by creating a suitable disturbance of the bulk cargo inside the liner, that cargo can be fluidized and drawn out through discharge outlet 30d without tilting the cargo container or the liner; and moreover, by firmly securing the liner inside the cargo container, as taught hereinabove, the liner is able to withstand the turbulence needed to create the desired fluidized cargo.

More specifically, gas supply line 92 is connected to a pressurized gas source, schematically represented at 94 in FIG. 26, which may supply pressurized air or nitrogen for example, and this line 92 is also connected to liner inlet 30c via an inlet chute; and discharge line 96 is connected to a low pressure or vacuum source, schematically represented at 98 in FIG. 26, which may be a conventional pump, and this line 96 is also connected to liner outlet 30d via an outlet chute. Pressurized air is conducted into liner 10 through hose 92, while gas and product is withdrawn from the liner through hose 96. Preferably, during at least most of the time during which product is withdrawn from the liner, the volume of gas conducted into the liner is at about, or substantially at, the same rate at which the volume of the gas and cargo withdrawn from the liner; and to help accomplish this, it is desirable to use a supply hose 92 having a diameter that is the same as the diameter of discharge hose 96.

In addition, preferably, during at least most of the time during which cargo is discharged from liner 10, the pressure on the cargo is maintained slightly above the ambient atmospheric pressure. The air pressure inside the liner is preferably high enough to keep the liner inflated inside container 50, but this pressure should not be allowed to increase to a level where it might damage the cargo container. Pressure sensors, not shown, may be located inside container 50 or liner 10 and connected to pressurized gas source 94 to sense the pressure inside the liner and to deactivate the pressurized gas source to stop the flow of gas into the liner when the pressure therein rises above a given level. Further, under some circumstances, especially if the liner 10 is completely filled with cargo, it may be desirable to start unloading by withdrawing same cargo by vacuum from the liner to develop a space above the cargo therein, before conducting gas or air into the liner via hose 92.

FIG. 28 illustrates an alternate bracing system 300 for bracing a bulkhead, generally referenced at 302, in a cargo container, generally referenced at 304. System 300 comprises first and second vertical straps 306 and 310 and at least one cross member, and preferably this bracing system includes a plurality of cross members 312, 314, 316 and 320. Each of the vertical straps is connected to the container body 304 and extends downward, rearward of bulkhead 302; and each of these straps includes at least one loop, and preferably each strap includes a plurality of loops In particular, strap 306 includes loops 322, 324, 326 and 330; and strap 310 includes loops 332, 334, 336 and 340. Each of the cross beams 312, 314, 316, and 320 laterally extend rearward of and against bulkhead 302, and extends through and is supported by a respective one loop of each vertical strap.

More specifically, with the embodiment of bracing system 300 shown in FIG. 28, cross beam 312 extends through loops 322 and 332, cross beam 314 extends through loops 324 and 334, cross beam 316 extends though loops 326 and 336, and cross beam 320 extends through loops 330 and 340. Also, each cross beam has right and left ends, each of which is braced or supported by container body against rearward movement. With this arrangement, straps 306 and 310 hold cross beams 312, 314, 316, and 320 at selected heights, container body 304 braces the cross beams against rearward movement, and those cross beams in turn, brace bulkhead 302 against rearward movement. Preferably, the cross beams are braced against rearward movement by simply locating the right and left ends of those cross beams immediately forward of and abutting against right and left back corner posts 342 and 344, respectively, of cargo container 304. If desired, these ends of the cross beams may be screwed or bolted, or otherwise secured to the corner posts, or to adjacent portions of the container body.

Straps 306 and 310 are substantially identical, and thus only one, strap 306, will be described here in detail. Preferably, this strap includes a primary length section 306a and a plurality of smaller sections that are connected to the primary section to form loops 324, 326, and 330. One of these smaller sections is shown at 306b in FIG. 29; and this Figures also illustrates the manner in which strap section 306b cooperates with primary section 306a to form loop 324, and the manner in which cross beam 314 extends through that loop. Section 306b may be connected to section 306a in any suitable manner such as by gluing or sewing the former section to the latter section. The bottom loop on each of the vertical straps may be formed by simply folding upward the bottom portion of the strap and then connecting the bottom edge of that strap to a portion of the strap above the bottom thereof.

Straps 306 and 310 and cross beams 312, 314, 316, and 320 of bracing system 300 may be arranged in any suitable pattern and in any suitable positions against the back of bulkhead 302. For instance, as shown in FIG. 28, the bulkhead includes discharge opening 346 to discharge cargo from container 304, and straps 306 and 310 are respectively disposed to the left and right of the discharge opening. A first cross beam 312 laterally extends across the discharge opening, preferably about halfway between the top and bottom edges thereof; and cross beam 314 laterally extends across the bulkhead, slightly above the top edge of the discharge opening. Also, bulkhead 302 includes inlet openings 350; and cross beam 320 laterally extends across the bulkhead, slightly below the inlet openings, while cross beam 316 laterally extends across the bulkhead, approximately midway between beams 314 and 320.

Also, as shown in FIG. 28, preferably straps 306 and 310 are substantially vertical, and cross beams 312, 314, 316, and 320 are each substantially horizontal. As will be understood by those of ordinary skill in the art, it is not necessary to the present invention that straps 306 and 310 be vertical, or that beams 312, 314, 316, and 320 be horizontal, and other alternate arrangements may also be used.

The straps 306 and 310 used in bracing system 300 may be made of any suitable material; and for instance, the straps may be made of a flexible, high-strength metal. Alternatively, these straps may be constructed of woven polyethylene and polypropylene, or the straps may be made from strips, such as 2" strips, of fiberglass tapes, metal reinforced tapes or polyester reinforced tapes. As still further examples, these straps could be made from co-extruded cross-laminated plastic film, or co-extruded, or cross-laminated film. Straps of various widths and thicknesses may be used in bracing system 300; and, for instance, the width of each strap may be between ¾" and 2" and the thickness of the straps may be between 20 and 80 mils, and each strap may have a break strength of between 4,000 and 20,000 lbs.

The straps of bracing means 300 may be connected to the body of container 304 in any suitable manner; and, for example, these straps may be connected to the container body by one or more of the procedures discussed above in connection with FIGS. 18 and 19.

The cross beams 312, 314, 316, and 320 of bracing system 300 may also be made from any suitable material. For instance, with reference to FIG. 29, these beams may have a hollow, square or rectangular cross-section, and may be made of aluminum or another metal.

FIG. 30 shows another bracing system, generally referenced at 360, for bracing bulkhead 302 in cargo container 304. System 360 comprises a plurality of upright beams 362 and 364 and a plurality of cross beams 366, 370, and 372. Beams 362 and 364 are connected to the floor of cargo container 304, are horizontally spaced apart, and extend upward along the bulkhead 302. Cross beams 366, 370, and 372 are connected to and supported by upright beams 362 and 364, and laterally extend rearward of and against the bulkhead; and each of these cross beams has right and left ends that are braced by the container body against rearward movement. Beams 362 and 364 thus hold cross beams 366, 370, and 372 at selected heights, the cargo container braces the cross beams against rearward movement, and those cross beams brace the bulkhead against rearward movement.

Preferably, as with bracing system 300, the supports cross beams are braced against rearward movement by locating the right and left ends of those beams immediately forward of and abutting against right and left back corner posts 342 and 344, respectively, of the cargo container. These ends of the cross beams may also be screwed or bolted, or otherwise secured, to those corner posts, or to adjacent surfaces of container body 302.

With reference to FIG. 31, preferably the cross beams are releasably connected to the upright beams, and this can be done by simply screwing each cross beam to each vertical beam, as represented by the screw and nut respectively shown at 374 and 376 in FIG. 31.

One advantage of connecting the cross beams to the upright beams in this way is that it allows the framework formed by the beams to be moved between an operative position, as shown in FIG. 30, and a relatively compact, collapsed position, as shown in FIG. 32. To elaborate, to move the framework from the latter position to the former position, the cross beams are simply pivoted relative to the upright beams to positions where the former beams are substantially perpendicular to the latter beams. After the framework formed by the cross and upright beams is moved into this operative position, the connection between the cross beams and the upright beams may be tightened to hold that framework in that operative position, and then the framework may be secured to container body 304, immediately behind bulkhead 302.

The upright beams may be connected to the container floor in any suitable manner. For instance, again with reference to FIG. 31, a flange 380, which may be integral with or otherwise connected to beam 362, may be bolted to container floor 382 to connect beam 362 thereto.

Preferably, the upright beams are substantially vertical; and these beams extend upward to, or approximately to, the roof or top of cargo container 304, and the top ends of those vertical beams also engage the container body and are braced thereby against rearward movement. This can be done by simply locating those top ends forward of and abutting against a top cross beam 384 of the container body, or the top ends of beams 362 and 364 can be screwed or bolted to the container body.

The beams of bracing system 300 may also be located in any suitable pattern and any suitable positions against the back of bulkhead 302. For example, as shown in FIG. 30, vertical beams 362 and 364 are located, respectively, to the left and right of discharge opening 346. A first cross beam 366 laterally extends across bulkhead 302, slightly above the top edge of the discharge opening, a second cross beam 372 extends across the bulkhead slightly below inlet openings 350, and a third cross beam 370 extends across the bulkhead, between beams 366 and 372.

Beams 362, 364, 366, 370, and 372 may be made from any suitable material or materials. For instance, these beams also may be made from aluminum or another metal and have a hollow, square or rectangular cross section.

Liners that are used to line the interiors of large cargo containers are often provided with a transverse sleeve extending along the front bottom edge of the liner; and a wooden beam is placed in that sleeve and nailed to the container floor, closely adjacent the front wall of the container, to help secure the liner therein. This transverse sleeve may be formed in various ways; and for instance, with reference to FIGS. 1 and 2, reinforcing panel 14 may be secured to bottom and front panel 16 and 26 of liner 10 so as to form a sleeve transversely extending along the front, bottom edge of the liner. Alternatively, a separate piece of material may be connected to the bottom and front panels of liner 10 to form such a sleeve.

FIGS. 33 through 38 illustrate alternate arrangements for forming a transverse sleeve along the front, bottom edge of a liner and using material that commonly is simply cut off the liner. More generally, these figures show a procedure for shaping or folding a tubular member 400 into a liner 402 for a cargo container, and in which material, tubular member is used to form a transverse sleeve extending along the front, bottom edge of the liner.

FIG. 33 shows a flexible tubular member 400 having front and back ends 404 and 406. To form a liner from this material, first and second sections 410 and 412 of the tubular member, both of which extend rearward from the front end of that member, are folded toward each other and then connected together to form, as shown in FIG. 34, front panel 414 of the liner, and upper and lower flaps 416 and 420. More specifically, section 410 is folded inward about an edge, which becomes the right front edge of the liner; and section 412 is folded inward about an edge, which becomes the left front edge of the liner. As sections 410 and 412 are so folded, a portion of section 410 and a portion of section 412 are folded against a third section 422 of tubular member 400, forming lower flap 420, which has a generally triangular shape; and a portion of section 410 and a portion of section 412 are folded against a fourth section 424 of tubular material, forming upper flap 416, which also has a generally triangular shape.

In FIGS. 33 and 34, tubular member 400 is shown in an inflated or expanded condition, with a generally uniform, rectangular transverse cross-section and having well-defined bottom, top and left and right sides. It is not necessary that the tubular member have that shape when sections 410, 412, 422, and 424 are folded together, however; and those sections may be folded together to form front panel 414 when tubular member 400 itself is in a relatively flat condition, or in a partially expanded or inflated condition.

After sections 410 and 412 are folded together to form front panel 414, top and bottom edges 426 and 430 of the panel are connected to adjacent portions of tubular member 400; and in particular, those edges are respectively connected to portions of the tubular member that are, or that become, the front edges of the top and bottom panels of the liner formed from the tubular member. Edges 426 and 430 may be connected to the adjacent portions of tubular body, and material sections 410 and 412 may be connected to each other, in any suitable manner, such as by heat sealing. Preferably, section 410 is connected to section 412 along at least the full height of front panel 414, and edges 426 and 430 are connected to the adjacent portions of tubular member 400 along the entire lengths of those edges, forming a seal between the front, top and bottom panels of the liner formed from tubular member 400.

After the top edge of front panel 414 is connected to the adjacent portion of tubular member 400, the excess material of top flap—that is, the material between top edge 426 and the tip of that flap—may be cut off, or that entire flap may be connected to the top side of tubular member 400. After the bottom edge of the front panel is connected to the adjacent portion of tubular member 400, bottom flap 420 is preferably used to form a sleeve transversely extending along that bottom edge.

Various specific procedures may be used to form a transverse sleeve from flap 420. For example, with particular reference to FIG. 36, bottom flap 420 may be folded over and onto itself so that a first transverse strip of the flap is placed directly on a second transverse strip of the flap, as shown at 432, parallel to and extending along bottom edge 430 of front panel 414. Those first and second strips are then connected together, such as by sewing or heat-sealing, to form sleeve 434. Preferably, at least a portion 436 of flap 420 is also placed directly against and connected to front panel 414, extending up from front edge 430 for a distance of about three to twelve inches; and portion 436 may be connected to panel 414 in any appropriate manner, again such as by sewing or heat-sealing. After the sleeve 434 is formed, the excess material of bottom flap 420—that is, the material between portion 436 and the tip of the flap (not shown in FIG. 36)—may be cut or trimmed off, or that material may be connected to the front panel 414.

FIG. 37 shows a transverse sleeve 440 formed in an alternate manner. To form this sleeve, with reference to FIGS. 35 and 37, bottom flap 420 is folded upward, about edge 430, and connected to front panel 414 along a line referenced at 442, parallel to and slightly spaced above edge 430. Preferably, this connection is also made by a heat-sealing process, although other connecting procedures may also be used; and after sleeve 440 is formed, the excess material of flap 420 between connection 442 and the tip of the flap may be cut off or connected to front panel 414.

FIG. 38 shows a transverse sleeve 444 made according to a third procedure. With particular reference to FIGS. 35 and 38, sleeve 444 is made by folding bottom flap 420 beneath itself and connecting a transverse strip or portion 446 of the flap to a bottom panel of liner 402, parallel to and extending along edge 430. Portion 446 of flap 420 may be connected to the bottom panel of the liner by sewing or a heat-sealing process; however, other suitable procedures may also be employed. Once sleeve 444 is formed, the excess material of flap 420—the material between portion 446 and the tip of the flap—may be cut off or connected to the bottom panel of the liner.

Any suitable procedure may be used to form a back panel for the liner 402. For instance, sections of tubular member 400 adjacent the back end thereof may be folded together to form a back panel, or a separate piece of material may be connected to the back end of the tubular member to form a back panel.

Liner 402 may be made from any suitable material, such as a thin polyethylene material; and after the desired liner is formed, the liner may be stored, handled and secured in a cargo container in any suitable manner. For example, the liner may be provided with a multitude of connecting segments 32 and 34 described above to help hold the liner in place in a cargo container.

To install liner 402 inside a cargo container, the liner is placed on or over the floor thereof, with left and right bottom edges of the liner adjacent, respectively, the left and right bottom inside edges of the cargo container, and with the bottom front edge of the liner adjacent the bottom front edge of the cargo container. With reference to FIG. 39, an elongated member 450, such as a wooden slat or beam is located in sleeve 434, and then that beam is nailed to the container floor 452. Preferably, lower portions of the liner are further secured to the container, the liner is then partially or fully expanded, and upper portions of the liner are also secured to the container walls or roof. A bulkhead may be installed in the cargo container, against the back panel of the liner, and further bracing may be provided to further support that back panel of the liner.

Container liners of the general type described herein are often provided with a back panel having inlet and discharge openings, and chutes are connected to the back panels, around those openings, to facilitate loading bulk cargos into and discharging bulk cargos from the liners. Normally these chutes are formed from separate pieces of material and then connected to the back panel of a liner, around the inlet and discharge openings therein.

FIGS. 40 through 44 illustrate an alternate arrangement for forming these inlet and outlet chutes and using material that commonly is simply cut off the liner. More generally, these Figures show a procedure for shaping or folding a tubular member 460 into a liner 462 for a cargo container, and in which materials, which in similar prior art procedures had been cut off that tubular member, are used to form inlet and outlet chutes for the liner.

FIG. 40 shows fluxable tubular member 460 having front and back ends 464 and 466. To form a liner from this material, first and second sections 470 and 472 of the tubular member, both of which extend forward from the back end of that member, are folded toward each other and then connected together to form, as shown in FIG. 41, back panel 474 and upper and lower flaps 476 and 480. More specifically, section 470 is folded inward about an edge, which becomes the right back edge of the liner; and section 472 is folded inward about an edge, which becomes the left back edge of the liner. As sections 470 and 472 are so folded, a portion of section 470 and a portion of section 472 are folded against a third section 482 of tubular member 460, forming lower flap 480, which has a generally triangular shape; and a portion of section 470 and a portion of section 472 are folded against a fourth section 484 of tubular member 460, forming upper flap 476, which also has a generally triangular shape. After sections 470 and 472 are so folded together, these sections are joined together along their common edge, and preferably these sections are heat-sealed together along the full height or length of this common edge.

In FIGS. 40 and 41, tubular member 460 is shown in an inflated or expanded condition, with a generally uniform, rectangular transverse cross-section and having well-defined bottom, top, and left and right sides. It is not necessary that tubular member have that shape when sections 470, 472, 482, and 484 are folded together, however; and those sections may be folded together to form front panel 474 when tubular member 460 itself is in a relatively flat condition, or in a partially expanded or inflated condition.

After sections 470 and 472 are folded together to form back panel 474, top and bottom edges 486 and 488 of that panel are connected to adjacent portions of tubular member 460; and in particular, those edges are respectively connected to portions of the tubular member 460 that are, or that become, the back edges of the top and bottom panels of the liner formed from the tubular member. The top and back panels of the liner are not sealed together along the complete length of edge 486, though; and for at least a portion of this edge, these top and back panels are moveable away from each other to form an opening that provides access to the interior of liner 462, adjacent or through the top edge of the liner. Likewise, the bottom and back panels of liner 462 are not sealed together along the complete length of edge 488; and for at least a portion of this edge, these bottom and back panels are moveable away from each other to form an opening that provides access to the interior of the liner, adjacent or through the bottom edge of the liner. Edges 486 and 488 may be connected to the adjacent portions of the top and bottom panels of tubular member 400 in any suitable way, such as by heat-sealing.

With reference to FIGS. 41 through 44, after sections 470 and 472 are folded and connected together to form front panel 474 and top and bottom flaps 476 and 480, the top flap is used to form inlet chute 490 and the bottom flap is used to form discharge chute 492. More specifically, inlet chute 490 is formed by spreading apart the layers of top flap 476 to form a front opening 490a, a back opening 409b in communication with the interior of liner 462, and a conduit 490c extending between openings 490a and 490b to conduct a bulk cargo therebetween, and in particular to load the bulk cargo into liner 462. Similarly, discharge chute 492 is formed by spreading apart the layers of bottom flap 480 to form a front opening 492a, a back opening 492b in communication with the interior of liner 462, and a conduit 492c extending between openings 492a and 492b to conduct a bulk cargo therebetween, and in particular, to discharge the bulk cargo from the liner. Preferably, with particular reference to FIGS. 41 and 42, outward portions of flaps 476 and 480 are cut off from the rest of these flaps, to increase the width or size of each of the front openings 490a and 492a.

Any suitable procedure may be used to form a front panel for the liner 462. For instance, sections of tubular member 460 adjacent the front end thereof may be folded together to form a front panel, or a separate piece of material may be connected to the front end of tubular member 460 to form a front panel.

Liner 462 may be made from any suitable material, such as a thin polyethylene material; and after the desired liner is formed, the liner may be stored, handled, and secured in a cargo container in any suitable manner. For example, the liner may be provided with a multitude of connecting segments 32 and 34 described above to help hold the liner in place in a cargo container.

To install liner 462 inside a cargo container, the liner is placed on or over the floor thereof, with left and right bottom edges of the liner adjacent, respectively, the left and right bottom inside edges of the cargo container, and with the bottom front edge of the liner adjacent the bottom front edge of the cargo container. Lower portions of the liner are secured to the container, the liner is then partially or fully expanded, and upper portions of the liner are also secured to the container walls or roof. A bulkhead may be installed in the cargo container, against the back panel of the liner, and further bracing may be provided to further support that back panel of the liner. The liner is then loaded with a bulk cargo by conducting that cargo inward, through inlet chute 490 and into the interior of liner 462. When it is desired to unload the cargo from the liner, this is done by discharging the cargo through discharge chute 492 and opening 492a.

FIGS. 45 through 48 show an alternate bulkhead 500 that may be used to support a liner inside a cargo container, for example of the type shown in FIG. 11. Generally, bulkhead 500 includes a central wall member 502, which in turn includes first and second sections 504 and 506. Preferably, wall member 502 further includes connecting section 510; and the bulkhead itself further includes left, right, and bottom panels 512, 514, and 516, and left and right corner members 520 and 522.

Wall member 502 is adapted to rest on the floor of a cargo container in a close fit with the side walls thereof, to hold a cargo in the cargo container; and as illustrated in FIGS. 45 and 46, the wall member has a generally flat or planar, rectangular shape. Wall member 502 defines an outlet or discharge opening 524 to discharge cargo from the cargo container through the bulkhead, and preferably the wall member also defines an inlet opening 526 to conduct cargo through the bulkhead and into the container. Second wall section 506 of wall member 502 is foldably connected to first wall section 504 for folding movement between open and closed positions. In the open position, shown in FIGS. 45 and 46, second section 506 extends outward from first section 504 generally coplanar therewith; and in the folded position, shown in FIG. 47, the second section extends over the first section, generally parallel thereto.

With the embodiment of bulkhead 500 shown in FIGS. 45 through 48, connecting section 510 foldably connects together first and second sections 504 and 506 for movement between the above-described open and closed positions. More specifically, connecting section 510 is connected to first section 504 along a first fold line 510a, and is connected to second section 506 along a second fold line 510b, parallel to the first fold line. When the second section of wall member 502 is in its open position, connecting section 510 is substantially coplanar with both the first and second section of the wall member, as shown in FIGS. 45 and 46. As the second section 506 moves from its open position to its closed position, the second section pivots about second fold line 510b, and at the same time, connecting section 510 pivots about first fold line 510a. When the second section is in its closed position, the connecting section is substantially perpendicular to both the first and second sections of the wall member, as shown in FIG. 47.

With the embodiment of bulkhead 500 shown in FIGS. 45 and 46, first and second sections 504 and 506 respectively comprise lower and upper sections of the bulkhead. Alternatively, sections 504 and 506 may comprise left and right sections of the bulkhead and may be connected together for pivotal movement about a vertical fold line or connecting section. In addition, in bulkhead 500, discharge opening 524 is located in first section 504, inlet opening 526 is located in second section 506, each of the discharge and inlet openings has a substantially rectangular shape, and the inlet opening includes a lower edge 526a that is closely adjacent or colinear with fold line 510b. These details are not necessary to the practice of the present invention in its broadest sense; and for example, inlet opening 526 may be formed in first section 504 of wall member 502 at a level below connecting panel 510. Indeed, it is not necessary that bulkhead 500 itself define an inlet opening; and in use, cargo may be loaded into a lined cargo container through a liner inlet located at a level above the top of the bulkhead.

Left, right, and bottom panels 512, 514, and 516 are connected to left, right, and bottom edges, respectively, of central wall member 502, and these panels extend outward from the central wall member, preferably substantially perpendicular thereto. Panels 512, 514, and 516 are adapted to fit, respectively, against left and right side walls and a floor of a container to help hold bulkhead 500 securely therein.

To facilitate the above-described folding movement of central wall member 502, left and right panels 512 and 514 of bulkhead 500 are preferably each comprised of two, spaced apart sections, as specifically shown in FIGS. 45 and 46. To elaborate, the left panel includes first and second sections 512a and 512b; and these two sections are spaced apart and form left gap 512c, which is located at the left end of connecting section 510. Similarly, the right panel includes first and second sections 514a and 514b; and these two sections are spaced apart and form right gap 514c, which is located at the right end of connecting section 510. Gap 512c allows the sections of the left panels to move easily relative to each other, and gap 514c allows the sections of the right panel to move easily relative to each other as the sections 504 and 506 of central member 502 move between the open and closed positions of bulkhead 500.

Corner members 520 and 522, preferably, are of the same general type described in detail in U.S. Pat. Nos. 4,799,607 and 4,884,722. Generally, these corner members have triangular shapes and are connected to central wall member 502 along connecting lines 520a and 522a for movement between open and closed positions. In their closed positions, shown in FIGS. 46 and 47, the corner members lie over central member 502, generally parallel thereto; and in their open positions (not shown), the corner members slant downwardly outwardly away from central member 502 and laterally downwardly toward discharge opening 524. As discussed in greater detail in U.S. Pat. Nos. 4,799,607 and 4,884,722, when a bulkhead is installed on a cargo container and the corner members 520 and 522 are in their open positions, these corner members help to guide a cargo toward discharge outlet 524 as the cargo is unloaded from the cargo container.

When bulkhead 500 is provided with corner members 502 and 522, preferably these corner members are located below second section 506, so that the corner members do not interfere with folding movement of that section between its open and closed positions.

Bulkhead 500 may be formed from any suitable materials and in any suitable procedure. For example, the bulkhead, or at least sections 504, 506, and 510 and panels 512, 514, and 516, may be formed from a single blank of corrugated cardboard, which is scored to form fold lines 510a and 510b and panels 512, 514, and 516. Alternatively, as shown in FIG. 48, first and second sections 504 and 506 of the bulkhead may be formed from first and second blanks 530 and 532, respectively, which are subsequently connected together Any appropriate means may be used to connect blanks together, and for instance, this may be done by glue or staples.

In use, bulkhead 500 is positioned in a cargo container after a suitable liner has been installed therein, and the bulkhead is positioned in the cargo container with panel on the floor of the container, with wall member against a back panel of a liner and laterally extending completely or substantially completely across the container interior, and with panels against the left and right sidewalls of the cargo container. Further bracing may be provided to support the bulkhead. A bulk cargo is then loaded into the container liner, through bulkhead inlet; and when it is desired to discharge that cargo from the liner, that cargo is discharged through bulkhead outlet.

The bulkhead shown in FIGS. 45 through 48 can be used in intermodal ocean going containers, trailer trucks or other moveable containers. The bulkhead can also be used with non-moveable containers for the storage of commodities, and the bulkhead can be used with dry or liquid bulk commodities. Handles (not shown) may be connected to bulkhead 500 at any suitable location to help workers handle and move the bulkhead.

The liner, bulkheads, bracing systems, and methods disclosed herein may be used to carry or to help carry a large variety of products including dry bulk chemicals, powdered and pelletized resins, flour, coffee, and grains. In addition, the apparatus and method disclosed herein may be used to transport garbage or other waste materials without departing from the scope of the present invention. In particular, many municipalities are forced to transport garbage tens, hundreds, or even thousands of miles to dispose of the garbage. Often this is done by loading the garbage into large intermodal containers, and then transporting those containers by truck, railroad or ship, or some combination thereof, to an acceptable disposal site, where the containers are emptied.

One disadvantage with this procedure is that typically the cargo containers must be thoroughly cleaned before they can be used again, particularly if those containers are next used to carry food products; and this often requires returning the empty containers to, or to the general vicinity of, the municipality at which they were initially loaded with the garbage. As can be understood, transporting these empty containers, often for very considerable distances, is an inefficient use of the containers. A liner employing upper and lower connecting segments 32 and 34 disclosed herein is very well suited for use in the above-described application, because these connecting segments may be used to hold the liner inside a cargo container in a manner that prevents rips or tears from developing in the liner that might cause garbage to leak therefrom either as the garbage is loaded into or discharged from the liner.

By employing such a liner, either with or without other methods or apparatus disclosed herein, to line the interiors of cargo containers before they are loaded with the garbage, the liners may be used to keep the interior surfaces and walls of the cargo containers free and clean of the garbage. The cargo containers may then be reused immediately after being emptied of the garbage, to carry other products, eliminating the above-mentioned return trips of the empty containers.

FIGS. 49 and 50 show an intermodal cargo container 550 lined with a liner 552 particularly adapted to carry a load of garbage. Preferably, this liner has an open back end, and the left, right, top, and bottom panels of the liner extend past the back end of the cargo container, as shown in FIG. 49. After the liner is installed in the container, garbage is then loaded and compacted into the liner; and once the liner is full, the back portions of the liner are bunched together and tied together with a plastic tie cord or rope, as shown in FIG. 50. The container is then transported to a land fill or garbage site, at which the back end of the liner is opened, and the container is tilted to slide the garbage out of the container. Preferably, liner 552 is provided with connecting segments 32 and 34; however, it is not necessary to provide the liner with a back panel or with a back bulkhead.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. A semi-rigid collapsible bulkhead for supporting a cargo inside a cargo container, the cargo container having a floor and left and right sidewalls, the bulkhead comprising:

a central wall member adapted to rest on the floor of the cargo container in a close fit with the sidewalls thereof, to hold the cargo in the container, and defining a discharge opening to discharge the cargo from the container and through the bulkhead, and including i) a first section, and ii) a second section foldably connected to the first section for folding movement between open and folded positions, in said open position, the second section extends outward from the first section generally coplanar therewith, and in the folded position, the second section extends over the first section generally parallel thereto;

a left panel member connected to a left edge of the wall member and extending outward therefrom, and adapted to fit against the left sidewall of the container to help hold the bulkhead therein; [and]

a right panel member connected to a right edge of the wall member and extending outward therefrom, and adapted to fit against the right sidewall of the container to help hold the bulkhead therein[.]; *and*

*wherein the central member further includes a connecting section foldably connecting together the first and second sections of the central member, the connecting section being foldably connected to the first section of the central member along a first fold line, and foldably connected to the second section of the central member along a second fold line, parallel to the first fold line.*

[2. A bulkhead according to claim 1, wherein the central member further includes a connecting section foldably connecting together the first and second sections of the central member, the connecting section being foldably connected to the first section of the central member along a first fold line, and foldably connected to the second section of the central member along a second fold line, parallel to the first fold line.]

3. A bulkhead according to claim [2]*1*, wherein:

when the second section is in the open position, the connecting section is substantially coplanar with both the first and second sections of the central member; and when the second section is in the closed position, the connecting section is substantially perpendicular to both the first and second sections of the central member.

4. A bulkhead according to claim 3, wherein:

the left panel includes first and second spaced sections, said first and second left sections forming a left gap;

the right panel includes first and second spaced apart right sections, said first and second right section forming a right gap; and the connecting section laterally extends across the central member, between and laterally aligned with said left and right gaps, and said gaps facilitate folding the second section of the wall member between the open and folded positions.

5. [A bulkhead according to claim 1, further comprising:] *A semi-rigid collapsible bulkhead for supporting a cargo inside a cargo container, the cargo container having a floor and left and right sidewalls, the bulkhead comprising:*

*a central wall member adapted to rest on the floor of the cargo container in a close fit with the sidewalls thereof, to hold the cargo in the container, and defining a discharge opening to discharge the cargo from the container and through the bulkhead, and including*

*i) a first section, and*

*ii) a second section foldably connected to the first section for folding movement between open and folded positions,*

*in said open position, the second section extends outward from the first section generally coplanar therewith, and in the folder position, the second section extends over the first section generally parallel thereto;*

*a left panel member connected to a left edge of the wall member and extending outward therefrom, and adapted to fit against the left sidewall of the container to help hold the bulkhead therein;*

*a right panel member connected to a right edge of the wall member and extending outward therefrom, and adapted to fit against the right sidewall of the container to help hold the bulkhead therein;* at least a first corner member connected to the central member for pivotal movement between open and closed positions; and wherein:

in the closed position of the corner member, the corner member lies over the central member generally parallel thereto;

in the open position of the corner member, the corner member slants outwardly downwardly away from the central member and laterally downwardly toward the discharge opening to guide the cargo thereto; and the second section of the central member is connected to the first section thereof along a fold line, said fold line being located above the corner member when the corner member is in its closed position, wherein the corner member does not interfere with movement of the second section between the open and folded positions thereof.

6. A cargo container comprising:

a container body defining an interior cargo space, and including a floor and left and right side walls;

a flexible and expandable liner secured inside the container body, and including a back panel; and a semi-rigid bulkhead positioned in the container body and held against the back panel of a liner to support the liner in the container body, and including a central wall member defining a discharge opening to discharge the cargo from the container and through the bulkhead, the central wall member including i) a first section, [and]

ii) a second section foldably connected to the first section for folding movement between open and folded positions, in said open position, the second section extends outward from the first section generally coplanar therewith, and in the folded position, the second section extends over the first section generally parallel thereto, *and*

*iii) a connecting section foldably connecting together the first and second sections of the central wall member, the connecting section being foldably connected to the first section of the central wall member along a first fold line, and foldably connected to the second section of the central wall member along a second fold line, parallel to the first fold line.*

[7. A cargo container according to claim 6, wherein the central member of the bulkhead further includes a connecting section foldably connecting together the first and second sections of the central member, the connecting section being foldably connected to the first section of the central member along a first fold line, and foldably connected to the second section of the central member along a second fold line, parallel to the first fold line.]

8. A cargo container according to claim [7] *6*, wherein:

the bulkhead further includes i) a left panel member connected to a left edge of the wall member and extending outward therefrom and engaging the left side wall of the container to help hold the bulkhead therein, and ii) a right panel member connected to a right edge of the wall member and extending outward therefrom and engaging the right side wall of the container to help hold the bulkhead therein;

the left panel member includes first and second spaced apart left sections, said first and second left sections forming a left gap;

the right panel includes first and second spaced apart right sections, said first and second right sections forming a right gap; and the connecting section laterally extends across the central member of the bulkhead, between and laterally aligned with said left and right gaps, and said gaps facilitate folding the second section of the wall member between the open and folded positions.

* * * * *